US012123729B2

(12) United States Patent
Kundu et al.

(10) Patent No.: US 12,123,729 B2
(45) Date of Patent: Oct. 22, 2024

(54) PRECAUTIONARY OBSERVATION ZONE FOR VEHICLE ROUTING

(71) Applicant: Hitachi, Ltd., Tokyo (JP)

(72) Inventors: Subrata Kumar Kundu, Canton, MI (US); Yashodeep Dilip Lonari, Novi, MI (US); Xiaoliang Zhu, Northville, MI (US); Naveen Kumar Bangalore Ramaiah, Farmington Hills, MI (US)

(73) Assignee: HITACHI, LTD., Tokyo (JP)

( * ) Notice: Subject to any disclaimer, the term of this patent is extended or adjusted under 35 U.S.C. 154(b) by 241 days.

(21) Appl. No.: 17/476,529

(22) Filed: Sep. 16, 2021

(65) Prior Publication Data

US 2023/0080281 A1 Mar. 16, 2023

(51) Int. Cl.
*G01C 21/34* (2006.01)
*B60W 50/00* (2006.01)
(Continued)

(52) U.S. Cl.
CPC ......... *G01C 21/3469* (2013.01); *G06N 5/022* (2013.01); *B60W 50/0097* (2013.01); *B60W 60/001* (2020.02); *B60W 2420/403* (2013.01)

(58) Field of Classification Search
CPC ............ G01C 21/3469; G01C 21/3453; G06N 5/022; B60W 50/0097; B60W 60/001; B60W 2420/42
USPC .... 701/23, 1, 533, 123, 70, 41, 25, 410, 93, 701/301, 400, 26, 36, 96, 117, 423, 28, 701/411, 532, 527, 439, 408, 54, 2, 409, 701/414, 300, 24, 119, 31.4, 48, 51, 425, 701/29.1, 99, 428, 102, 420, 538, 465, 701/45, 537, 118, 27, 33.4, 415, 37, 468, 701/426, 416, 424, 540, 65, 110, 94, 701/32.3, 412, 42, 34.4, 50, 53, 101, 454, 701/521, 523, 58, 98, 113, 418, 457, 467, 701/103, 112, 302, 417, 431, 469, 32.9, 701/55, 67, 84, 38, 422, 430, 49, 115, 701/116, 484, 79, 19, 32.1, 32.2, 437, 701/446, 461, 82, 29.3, 34.2, 438, 445, 701/71, 72, 80, 104, 29.2, 516, 534, 56, 701/59, 20, 3, 31.5, 32.4, 32.8, 413, 451,
(Continued)

(56) References Cited

U.S. PATENT DOCUMENTS

2016/0244062 A1 * 8/2016 Tudosie .......... G08G 1/096844
2019/0056739 A1 * 2/2019 Sunil Kumar ....... G05D 1/0268
(Continued)

FOREIGN PATENT DOCUMENTS

WO WO-2021096935 A2 * 5/2021 ............ B60W 40/04

*Primary Examiner* — Anne Marie Antonucci
*Assistant Examiner* — Jodi Jones
(74) *Attorney, Agent, or Firm* — MATTINGLY & MALUR, PC

(57) ABSTRACT

In some examples, a system may determine a plurality of candidate routes between a source location of a vehicle and a destination location for the vehicle. Further, the system may determine one or more respective observation zone volumes for each candidate route of the plurality of candidate routes. The system may determine a field of view (FOV) for one or more vehicle sensors onboard the vehicle. In addition, the system may select a route for the vehicle from the plurality of candidate routes based at least on comparing an overlap of the FOV with the respective observation zone volumes for the candidate routes.

20 Claims, 23 Drawing Sheets

(51) Int. Cl.
 *B60W 60/00* (2020.01)
 *G06N 5/022* (2023.01)
(58) Field of Classification Search
 USPC ..... 701/519, 526, 541, 57, 69, 73, 105, 120,
 701/121, 124, 21, 29.5, 30.2, 31.9, 432,
 701/433, 436, 512, 66, 95, 10, 29.7, 30.3,
 701/32.7, 34.3, 427, 43, 450, 482, 487,
 701/517, 68, 90, 100, 109, 114, 122, 16,
 701/29.6, 30.5, 31.6, 31.7, 32.5, 33.1,
 701/33.2, 33.3, 33.7, 419, 421, 440, 442,
 701/443, 447, 448, 455, 456, 466, 480,
 701/486, 491, 522, 528, 536, 64, 7, 74,
 701/75, 77, 78, 83, 85, 9, 108, 111, 29.4,
 701/30.9, 31.3, 33.6, 40, 490, 507, 518,
 701/524, 539, 60, 86
 See application file for complete search history.

(56) References Cited

U.S. PATENT DOCUMENTS

2019/0277646 A1* 9/2019 Iagnemma ......... G01C 21/3691
2021/0146944 A1   5/2021 Kundu

* cited by examiner

PRECAUTIONARY OBSERVATION ZONE FOR VEHICLE ROUTING

BACKGROUND

Advanced driver assistance systems (ADAS) and semi-autonomous vehicle systems, self-driving systems, or otherwise autonomous driving (AD) systems are systems that automate or otherwise enhance vehicle control for improved safety, automated navigation, improved convenience, improved efficiency, and the like. Conventional navigation systems in traditional vehicles may typically provide one or more routing options for traveling from a source location to a destination location. Examples of factors considered by conventional navigation systems when determining routing options may include time to destination, traffic conditions, whether tolls are expected, road closures, and the like. However, when determining an optimal route for a vehicle, current systems may not take into consideration sensor capabilities and overall vehicle safety for a route prior to selecting the route.

SUMMARY

In some implementations, a system may determine a plurality of candidate routes between a source location of a vehicle and a destination location for the vehicle. Further, the system may determine one or more respective observation zone volumes for each candidate route of the plurality of candidate routes. The system may determine a field of view (FOV) for one or more vehicle sensors onboard the vehicle. In addition, the system may select a route for the vehicle from the plurality of candidate routes based at least on comparing an overlap of the FOV with the respective observation zone volumes for the candidate routes.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DESCRIPTION

Figure 1:
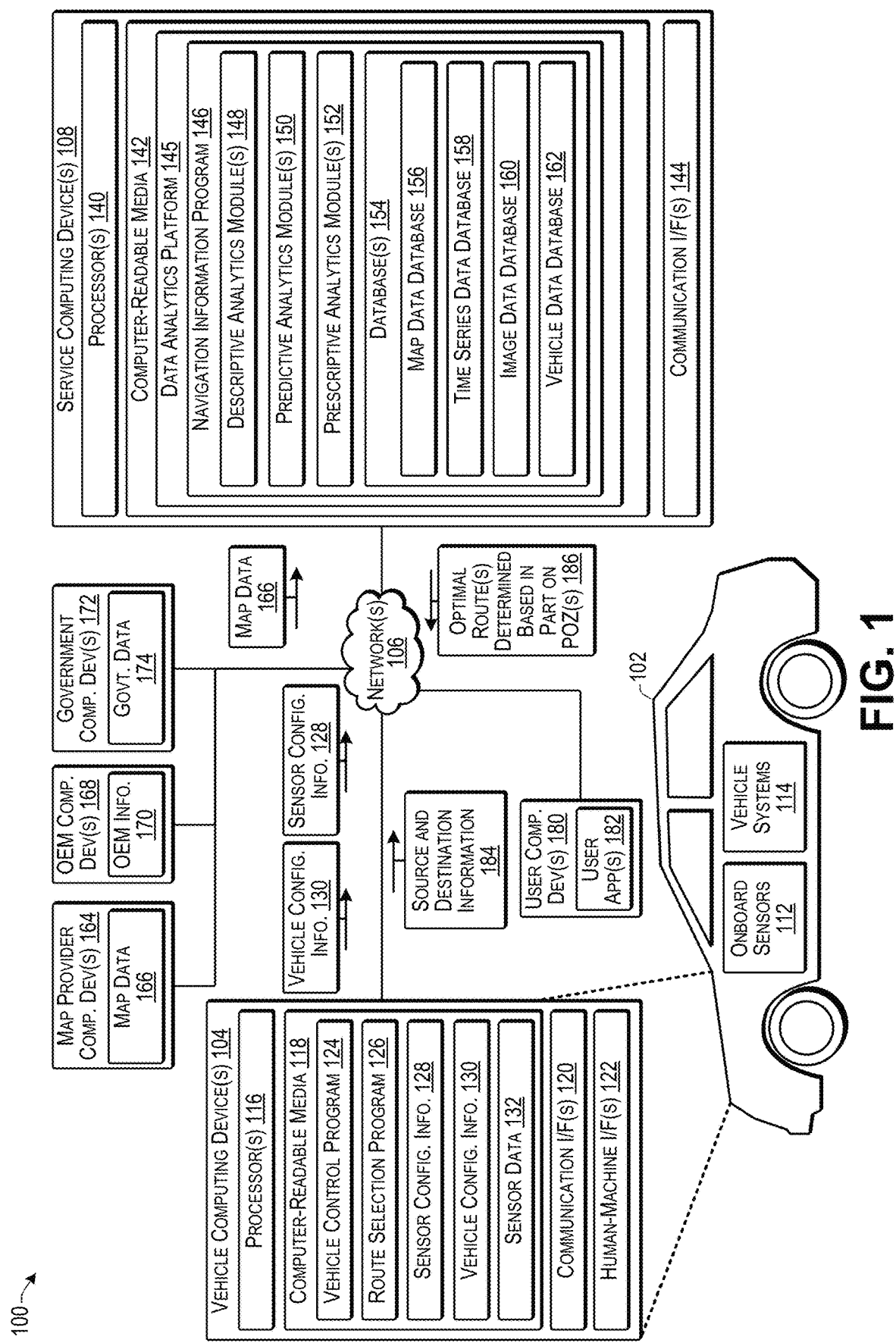
FIG. 1 illustrates an example route selection and vehicle navigation system according to some implementations.

Some implementations herein are directed to techniques and arrangements for selecting an optimally safe and navigable route for a vehicle to travel from a source location to a destination location. Examples herein may include calculation of a precautionary observation zone (POZ) that may be used for determining an optimal route for a vehicle. The determination of the POZ may take into consideration the types and capabilities of onboard sensors employed on the vehicle when selecting the optimal route, and may further take into consideration road features on each candidate route, the field of view (FOV) necessary for navigating each candidate route, as well as other considerations, as discussed below.

In some examples, the vehicle may access a connected data analytics platform and may provide information to the data analytics platform regarding the onboard sensors available on the vehicle, as well as providing a source location, a destination location, vehicle configuration information, and so forth. Further, the vehicle may receive, from the data analytics platform, information about one or more optimal routes selected by the data analytics platform for reaching the destination location. Alternatively, in other examples, the route determination may be performed by a computing device onboard the vehicle, or by another computing device, such as one or more computing devices located proximate to the vehicle, along a route of the vehicle, or the like.

Implementations herein may determine a plurality of POZs for each candidate route, and the POZs may be determined without the necessity of first acquiring and analyzing subject-based driver monitoring data. For instance, each candidate route may be divided into a plurality of segments, and a POZ may be calculated for each segment. The calculated POZ(s) may be used to determine the overall safety of each candidate route and a particular candidate route may be selected for the vehicle to traverse to a selected destination based at least in part on the respective safety scores. For example, it may be desirable to maximize the amount of time that will be allocated to autonomous driving along a route to improve overall safety of the vehicle and its passengers (e.g., most traffic accidents are caused by human error, so increasing autonomous driving time when it can be done safely can increase the overall safety of the vehicle). Further, by determining a POZ for each road segment, the system herein is able to determine in advance a zone that the vehicle should monitor to ensure its safety when traversing the respective road segment.

Ensuring safe vehicle operation is one of the underlying reasons for wider development and rapid progress of automated driving systems. Safety is one of the main aspects of automated driving systems that is causing their increased acceptance. Fully or partially autonomous vehicles are typically equipped with multiple sensors to continuously monitor the vehicle surroundings and to recognize potential obstacles for improving safety. Studies have shown that most accidents are caused by human driver error. Thus, an automated vehicle equipped with advanced sensing and data processing unit(s) may help to significantly reduce the possibility of accidents.

Sensors of the vehicles herein may play a major role in detecting obstacles around the vehicles and road features, which may ultimately help the vehicles avoid collisions. One or more onboard vehicle computing devices may receive sensor data from the onboard sensors, may process the sensor data in real time, and may send one or more signals to control the vehicle. Moreover, to ensure safety for all road conditions (urban, highway, etc.) and when considering different vehicle types, automated vehicle sensors may be configured to perceive long distance information as well. Thus, sensor fields of view (FOVs) and detection ranges are criteria that may be taken into consideration for designing an automated or semi-automated vehicle. Automotive manufacturers may utilize wide field of view and long detection range sensors to ensure the reliability of the vehicle. However, wide field of view and long detection range sensors are not only expensive but also increase the data amount for onboard processing units. This results in expensive processor requirements and may also result in increased power requirements that can ultimately reduce the vehicle efficiency. Thus, to keep the cost lower and make a more efficient vehicle, automotive manufacturers may employ sensors having an optimized specification. Considering the level of autonomous driving, automotive manufacturers may use either a standalone or a sensor fusion system. Since, level 2 and level 3 automated vehicles have limited sensors, these vehicles may not be able to recognize all of their surrounding obstacles and road features when traversing a route. Thus, it remains challenging to design an optimal sensor specification that optimizes cost and efficiency.

To improve the safety of an automated vehicle, implementations herein may maximize the amount of automated driving time for a trip so as to reduce the likelihood of collision due to human driver error. Consequently, at the beginning of any trip, some examples herein may identify optimal routes that maximize the amount of autonomous driving time. For instance, implementations herein may identify an optimal route to ensure the maximum safety of an automated vehicle (e.g., by maximizing the total amount of automated driving time during travel along the route) by considering sensor specifications of the vehicle. Further, implementations herein may identify the regions along each route that the automated vehicle may be required to monitor to operate the vehicle autonomously. These regions may be referred to as "Precautionary Observation Zones" (POZs) that a vehicle may monitor to ensure its safety. The POZs may be determined for all the road segments and/or waypoints along a selected route. In some cases, the POZ may be a 3D region (i.e., a volume of space) that may vary depending on the road types and waypoint locations. By comparing the POZ(s) with the vehicle on-board sensor specification (e.g., sensor field of view, sensor range, etc.), the system herein may determine how much of the POZ may be covered by the vehicle sensors during traversal of the route. Further, based on this comparison, the system and/or the vehicle may identify the optimally safest route(s) for the automated vehicles.

As one example, the POZ for a road segment may be determined using a camera-based driver monitoring system and data collected from monitoring a number of subjects. However, some examples herein included techniques for determining POZs by identifying the required observation zones for a route without prior subject-based driver monitoring data. In these techniques, a fully automated/semi-automated vehicle may communicate with a data analytics platform that may determine a plurality of candidate destination routes, such as by using a conventional routing engine. In the data analytics platform, potential routes are divided into multiple road segments and each road segment is categorized as to whether it is a part of an intersection functional area or not. Based on the category of the selected road segment, multiple parameters including stopping sight distance, perception reaction distance, maneuver distance, turn sight distance, etc. are calculated which are ultimately used to calculate the POZ for that road segment. The detailed technique to utilize the POZs for identifying the safest route utilizing the data analytics platform is described additionally below.

For discussion purposes, some example implementations are described in the environment of selecting a vehicle route (travel path) for a vehicle based on sensor capabilities and the determination of one or more POZs for a selected route. However, implementations herein are not limited to the particular examples provided, and may be extended to other types of sensing devices, other types of vehicles, other types of communications, other types of databases, other types of computing platforms and architectures, and so forth, as will be apparent to those of skill in the art in light of the disclosure herein.

FIG. 1 illustrates an example route selection and vehicle navigation system according to some implementations. The system 100 includes a vehicle 102 having one or more vehicle computing devices 104 able to communicate over one or more networks 106 with one or more service computing devices 108. The vehicle 102 may further include one or more sensors 112 and one or more vehicle systems 114 that are in communication with the vehicle computing device(s) 104, such as via a CAN bus (controller area network bus) (not shown in FIG. 1) or the like. In some examples, the service computing device(s) 108 may calculate precautionary observation zones (POZs) for candidate routes and may select the optimal route for the vehicle 102. In other examples, the vehicle 102 may perform some or all of the calculation of the POZs and using data received from the service computing devices. In some cases, selection of the optimal route may include consideration of the safety of the vehicle and its occupants for each candidate route.

Each vehicle computing device 104 may include one or more processors 116, one or more computer-readable media 118, one or more communication interfaces (I/Fs) 120, and one or more vehicle human-machine interfaces (I/Fs) 122. In some examples, the vehicle computing device(s) 104 may include one or more ECUs (electronic control units) or any of various other types of computing devices. For instance, the computing device(s) 104 may include one or more ADAS/AD ECUs for controlling at least some of the vehicle systems 114, such as to perform ADAS and/or AD tasks, such as navigation, braking, steering, acceleration, deceleration, and so forth. The computing device(s) 104 may also include one or more other ECUs, such as for controlling other systems of the vehicle systems 114, sensors 112, and so forth.

"ECU" is a generic term for any embedded processing system that controls one or more of the systems, subsystems, or components in a vehicle. Software, such as a vehicle control program 124 and a route selection program 126 may be executed by one or more ECUs and may be stored in a portion of the computer-readable media 118 (e.g., program ROM, solid state storage, etc., as discussed below) associated with the respective ECU to enable the ECU to operate as an embedded system. ECUs may typically communicate with each other over a vehicle bus, such as the CAN bus mentioned above, according to a vehicle bus protocol. As an example, the CAN bus protocol is a vehicle bus protocol that allows ECUs and the vehicle systems 114 to communicate with each other without a host computer. CAN bus may include at least two different types. For example, high-speed CAN may be used in applications where the bus runs from one end of the environment to the other, while fault-tolerant CAN is often used where groups of nodes are connected together.

Each ECU or other vehicle computing device 104 may include one or more processors 116, which may include one or more of central processing units (CPUs), graphics processing units (GPUs), microprocessors, microcomputers, microcontrollers, digital signal processors, state machines, logic circuits, and/or any devices that manipulate signals based on operational instructions. As one example, the processor(s) 116 may include one or more hardware processors and/or logic circuits of any suitable type specifically programmed or configured to execute the algorithms and other processes described herein. The processor(s) 116 may be configured to fetch and execute computer-readable instructions stored in the computer-readable media 118, which may program the processor(s) 116 to perform the functions described herein.

The computer-readable media 118 may include volatile and nonvolatile memory and/or removable and non-removable media implemented in any type of technology for storage of information, such as computer-readable instructions, data structures, programs, program modules, and other code or data. For example, the computer-readable media 118 may include, but is not limited to, RAM, ROM, EEPROM, flash memory or other memory technology, optical storage, solid state storage, magnetic disk, network-attached storage, cloud storage, or any other medium that can be used to store the desired information and that can be accessed by a computing device. Depending on the configuration of the vehicle computing device(s) 104, the computer-readable media 118 may be a tangible non-transitory medium to the extent that, when mentioned, non-transitory computer-readable media exclude media such as energy, carrier signals, electromagnetic waves, and/or signals per se. In some cases, the computer-readable media 118 may be at the same location as the vehicle computing device 104, while in other examples, a portion of the computer-readable media 118 may be remote from the vehicle computing device 104.

The computer-readable media 118 may be used to store any number of functional components that are executable by the processor(s) 116. In many implementations, these functional components comprise instructions or programs that are executable by the processor(s) 116 and that, when executed, specifically program the processor(s) 116 to perform the actions attributed herein to the vehicle computing device 104. Functional components stored in the computer-readable media 118 may include the vehicle control program 124 and the route selection program 126, each of which may include one or more computer programs, applications, executable code, or portions thereof. Further, while these programs are illustrated together in this example, during use, some or all of these programs may be executed on separate vehicle computing device(s) 104. Alternatively, in some examples, each of these programs 124 and 126 may be part of a single program.

In addition, the computer-readable media 118 may store data, data structures, machine-learning models, and other information used for performing the functions and services described herein. For example, the computer-readable media 118 may store sensor configuration information 128 that includes information about the sensor type, field of view, resolution, range and other capabilities, current status and operability, and so forth, of the sensors on board the vehicle. Further, the computer-readable media 118 may store vehicle configuration information 130 that includes information about the vehicle, such as powertrain configuration information, suspension information, tire information, as well as vehicle brand, model, year, trim level, and the like. Additionally, the computer-readable media 118 may store, at least temporarily, sensor data 132 received from the onboard sensors 112, and which may include information about obstacles and landmarks detected during a trip, vehicle location information, and so forth.

Further, while the functional components, data and data structures are illustrated together in this example, during use, some or all of these elements may be stored on or by separate ones of the computing device(s) 104. The computing device(s) 104 may also include or maintain other functional components and data, which may include programs, drivers, etc., and the data used or generated by the other functional components. Further, the computing device(s) 104 may include many other logical, programmatic, and physical components, of which those described above are merely examples that are related to the discussion herein.

The one or more communication interfaces 120 may include one or more software and hardware components for enabling communication with various other devices, such as over the CAN bus and/or over one or more network(s) 106. For example, the communication interface(s) 120 may enable communication through one or more of a LAN, the Internet, cable networks, cellular networks, wireless networks (e.g., Wi-Fi) and wired networks (e.g., CAN, Fibre Channel, fiber optic, Ethernet), direct connections, as well as close-range communications such as BLUETOOTH®, and the like, as additionally enumerated elsewhere herein.

The one or more networks 106 may include any appropriate network, including a wireless network, such as a cellular network; a wide area network, such as the Internet; a local area network, such an intranet; a local wireless network, such as Wi-Fi; close-range wireless communications, such as BLUETOOTH® or DSRC (dedicated short-range communications); a wired network, including fiber optics and Ethernet; any combination of the foregoing, or any other suitable communication network. Components used for such communication technologies can depend at least in part upon the type of network, the environment selected, or both. Protocols for communicating over such networks are well known and will not be discussed herein in detail.

The sensor data 132 may include sensor data received from the onboard sensors 112. For example, the onboard sensors 112 may include any of a plurality of different types of sensors such as a camera system, radar, LIDAR, ultrasound, a global navigation satellite system (GNSS) receiver (referred to hereinafter by the common usage name "GPS", which is also intended to be inclusive of any other satellite navigation system), accelerometers, a compass, and the like. In addition, the sensor data 132 used by the vehicle control program 124 may include information received from or associated with various vehicle systems 114, such as (not shown in FIG. 1) from a suspension controller associated with the suspension system, a steering controller associated with the steering system, a vehicle speed controller associated with a braking and acceleration system, and so forth.

For example, the vehicle control program 124 may use rule-based and or artificial-intelligence-based control algorithms to determine parameters for vehicle control. For instance, the vehicle control program 124 may determine an appropriate action, such as braking, steering, accelerating, or the like, and may send one or more control signals to one or more vehicle systems 114 based on the determined action. For example, the vehicle control program 124 may send control signals to the suspension controller, the steering controller, and/or the vehicle speed controller for controlling or partially controlling the vehicle in some applications.

The human-machine interface(s) 122 may include any suitable type of input/output devices, such as buttons, knobs, joysticks, touchscreens, speakers, microphones, voice recognition and artificial speech technology, in-cabin sensors, such as eye monitoring cameras, vital sign monitors, and so forth. As one example, a vehicle occupant may use a human-machine interface 122 to indicate a destination location, such as via voice command or touchscreen inputs. Implementations herein are not limited to any particular type of human-machine interfaces 122.

The service computing device(s) 108 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used.

Further, while the figures illustrate the functional components and data of the service computing device 108 as being present in a single location, these components and data may alternatively be distributed across different computing devices and different locations in any manner. Consequently, the functions may be implemented by one or more service computing devices, with the various functionality described herein distributed in various ways across the different computing devices. Multiple service computing devices 108 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each service computing device 108 may include one or more processors 140, one or more computer-readable media 142, and one or more communication interfaces 144. Each processor 140 may be a single processing unit or a number of processing units, and may include single or multiple computing units or multiple processing cores. The processor(s) 140 can be implemented as one or more microprocessors, microcomputers, microcontrollers, digital signal processors, central processing units, state machines, logic circuitries, and/or any devices that manipulate signals based on operational instructions. For instance, the processor(s) 140 may be one or more hardware processors and/or logic circuits of any suitable type specifically programmed or configured to execute the algorithms and processes described herein. The processor(s) 140 can be configured to fetch and execute computer-readable instructions stored in the computer-readable media 142, which can program the processor(s) 140 to perform the functions described herein.

The computer-readable media 142 may include volatile and nonvolatile memory and/or removable and non-removable media implemented in any type of technology for storage of information, such as computer-readable instructions, data structures, program modules, or other data. Such computer-readable media 142 may include, but is not limited to, RAM, ROM, EEPROM, flash memory or other memory technology, optical storage, solid state storage, magnetic tape, magnetic disk storage, storage arrays, network-attached storage, storage area networks, cloud storage, or any other medium that can be used to store the desired information and that can be accessed by a computing device. Depending on the configuration of the service computing device 108, the computer-readable media 142 may be a type of computer-readable storage media and/or may be a tangible non-transitory media to the extent that when mentioned herein, non-transitory computer-readable media exclude media such as energy, carrier signals, electromagnetic waves, and signals per se.

The computer-readable media 142 may be used to store any number of functional components that are executable by the processors 140. In many implementations, these functional components comprise instructions or programs that are executable by the processors 140 and that, when executed, specifically configure the one or more processors 140 to perform the actions attributed above to the service computing device 108. Functional components stored in the computer-readable media 142 may include a navigation information program 146 that may be executed to configure the service computing device 108 to determine and send navigation information, such as routing information, to the vehicle computing device 104. For example, the navigation information program 146 may include one or more descriptive analytics modules 148, one or more predictive analytics modules 150, and one or more prescriptive analytics modules 152, which may be executed for determining an optimal route for a vehicle 102, such as based on determining one or more POZs, as well as for performing other functions.

Examples of descriptive analytics modules 148 may include modules that perform communications, encryption/ decryption, data filtering, data fusion, and candidate route prediction and monitoring. Examples of predictive analytics modules 150 may include destination prediction, candidate route prediction and monitoring, determining a precautionary observation zone, speed profile determination, and anomaly prediction. Examples of prescriptive analytics modules 152 may include modules for managing safety, efficiency, comfort, and the like of vehicles and/or vehicle occupants. For example, the prescriptive analytics modules 152 may include modules for managing road anomalies, driver behavior, determining a drive horizon, determining efficient adaptive cruise control (ACC) operation, determining suspension control, determining occupant stress levels, and the like.

In addition, the computer-readable media 142 may store or access data used for performing the operations described herein. Further in some examples, the data may be stored in any suitable type data structures such as in one or more databases 154. Examples of databases 154 may include a map data database 156, a time series data database 158, an image data database 160, and a vehicle data database 162. For example, the map data database 156 may include information related to a required FOV for selected road segments, road profiles, high definition maps, and standard maps for various geographic regions. Furthermore, the time series data database 158 may include information such as traffic data, weather data, vehicular communication data, vehicle CAN data, sensor data, and so forth. Additionally, the image data database 160 may maintain images of roads, landmarks, intersections, and the like, such as may be received from infrastructure cameras, cell phone cameras, vehicle-mounted cameras, and so forth. In addition, the vehicle data database 162 may include information about each vehicle that uses the system 100, which may include vehicle identification information to use for communicating with the vehicle, sensor configuration information 128, vehicle configuration information 130, past destinations of the vehicle or vehicle occupants, information about an owner or other occupant associated with the vehicle, such as an occupant profile including occupant information and preferences, and so forth.

Further, the service computing device 108 may also include or maintain other functional components and data not specifically shown in FIG. 1, which may include programs, drivers, etc., and the data used or generated by the functional components. Additionally, the service computing device 108 may include many other logical, programmatic, and physical components, of which those described above are merely examples that are related to the discussion herein. Examples of machine-learning models (MLMs) that may be used in some examples of the modules 148, 150 and/or 152 herein, such as for the AI-based algorithms and models, may include predictive models, decision trees, classifiers, regression models, such as linear regression models, support vector machines, stochastic models, such as Markov models and hidden Markov models, and artificial neural networks, such as self-organizing neural networks, recurrent neural networks, convolutional neural networks, modular neural networks, deep-learning neural networks, and so forth.

The communication interface(s) 144 may include one or more interfaces and hardware components for enabling communication with various other devices, such as over the network(s) 106. For example, communication interface(s) 144 may enable communication through one or more of the Internet, cable networks, cellular networks, wireless networks (e.g., Wi-Fi) and wired networks (e.g., fiber optic and Ethernet), as well as close-range communications, such as BLUETOOTH®, BLUETOOTH® low energy, DSRC, and the like, as additionally enumerated elsewhere herein.

In addition, the service computing device(s) 108, and in some cases, the vehicle computing device(s) 104 may be able to communicate over the one or more networks 106 with one or more information source computing devices, such as web servers, service provider computing devices, public databases, private databases, or the like. Information source computing devices illustrated in this include one or more map provider computing device(s) 164 which may provide map data 166 to the service computing devices 108 and/or to the vehicle computing devices 104. Additionally, one or more OEM (original equipment manufacturer) computing devices may provide OEM information 170 about vehicles that they manufacture and/or may receive information about their vehicles from the service computing devices 108. Further, one or more government computing devices 172 may provide government data 174, such as road information, department of motor vehicle information, construction information, and so forth.

The information source computing device(s) 164, 168 and 172 may include hardware and software configurations similar to the service computing devices 108 described above, but with different functional components and data stored thereon or associated therewith. Further, while several types of information source computing devices are described herein, numerous other types of information source computing devices may provide information to the service computing devices 108 and/or the vehicle computing devices 104. For example, the information source computing devices may provide local condition data to the service computing device(s) 108 for indicating the current conditions of specified road segments, such as with respect to weather conditions, traffic, road closures, special events, and so forth.

In addition, a user computing device 180 may execute one or more user applications 182 for providing information and/or instructions to the service computing device 108. For instance, the user computing device may be a mobile device such as a cell phone, smart phone, tablet, wearable device, or the like that may be used to communicate directly with the service computing device 108 over the one or more networks 106. As one example, the user application 182 may include a browser and the user may use the browser to interact with the service computing device 108 such as for setting preferences, providing information about the vehicle 102, providing information about the user, or the like, via a web application, website, or other suitable user interface.

As one example, the vehicle computing device 104 may provide, to the service computing device 108, source and destination information 184 for a trip. For example, the route selection program 126 may be executed by the vehicle computing device 104 to send to the service computing device 108 the source location and destination location for desired travel. In addition, the vehicle computing device 104 may provide the sensor configuration information 128 and/or vehicle configuration information 130 to the service computing device 108 if the service computing device 108 does not already possess this information in the vehicle data database 162. Alternatively, in other examples, the vehicle computing device 104 may merely provide source location information to the service computing device 108 and may request a route from the service computing device 108. In response, the service computing device may predict a destination location such as based on a current time and current location and an analysis of past trips made by the vehicle 102. As still another example, the service computing device 108 may send a communication to cause the human machine interface 122 to query the vehicle occupant as to a destination location.

As discussed in additional detail below, the service computing device 108 may execute the navigation information program 146 to determine an optimal route for the vehicle 102 from the source location to the destination location. For example, the service computing device may execute the descriptive analytics module(s) 148, the predictive analytics module(s) 150, and the prescriptive analytics module(s) 152 to determine the optimal route based at least in part on determination of one or more POZs for one or more candidate routes. Upon determining the optimal route(s), the service computing device 108 may send the selected optimal route(s) 186 determined based in part on POZ(s) to the vehicle computing device 104. The vehicle control program 124 may be executed by the vehicle computing device 104 to navigate the vehicle 102 according to the optimal route(s) 186. Details of determining and selecting the optimal route(s) 186 based in part on POZs are discussed additionally below.

To realize benefits of connected vehicle technologies for partially/fully autonomous vehicles, the connected data analytics platform 145 may receive various different types of the data from different sources such as vehicles 102, infrastructure cameras and other sensors, cellphones, other transportation data services, and so forth, as discussed above. The data analytics platform 145 may process the received data to derive value for end users by using various different modules categorized in analytics layers, such as the descriptive analytics module(s) 148, predictive analytics module(s) 150, and prescriptive analytics module(s) 152. The descriptive analytics modules 148 may include multiple modules used for data processing, authentication, data filtering, data fusing, and so forth. The predictive analytics module(s) 150 may be used to predict different features expected for vehicle control, such as vehicle speed, route, anomaly prediction, and the like, such as by employing AI algorithms, simulation programs, and so forth. The prescriptive analytics modules 152 may include AI modules that provide values to various end users based on their respective requirements for safety, efficiency, comfort, and the like. Accordingly, the data analytics platform 145 may provide values based on user inputs and/or prediction. Furthermore, while three different types of modules are described in the example of FIG. 1, fewer or more types of modules may be employed in other examples of the system herein.

In the system 100, the route selection program 126 includes communications capability for connecting to the data analytics platform 145. Further, the route selection program 126 may determine the vehicle's current location from the onboard sensors 112 such as via a GPS receiver or the like. Accordingly, the route selection program 126 may be executed to transmit information about vehicle's current location, onboard sensor configuration information 128, and vehicle configuration information 130 such as, powertrain configuration, trim level, etc. to the data analytics platform 145. The data analytics platform 145 executes the navigation information program 146 to process the vehicle information and, if the destination location has been received from the vehicle computing device 104, the descriptive analytics module(s) 148 may be used to determine the candidate routes from the source location to the destination location. On the other hand, if the destination location cannot be determined from the information received from the vehicle computing device 104, then the predictive analytics module(s) 150 may be executed to predict the desired destination of the vehicle occupant, such as based on stored vehicle history in the vehicle data database 162. After the destination location is decided either from received inputs or based on prediction, the candidate routes may be determined as discussed additionally below.

Figure 2:
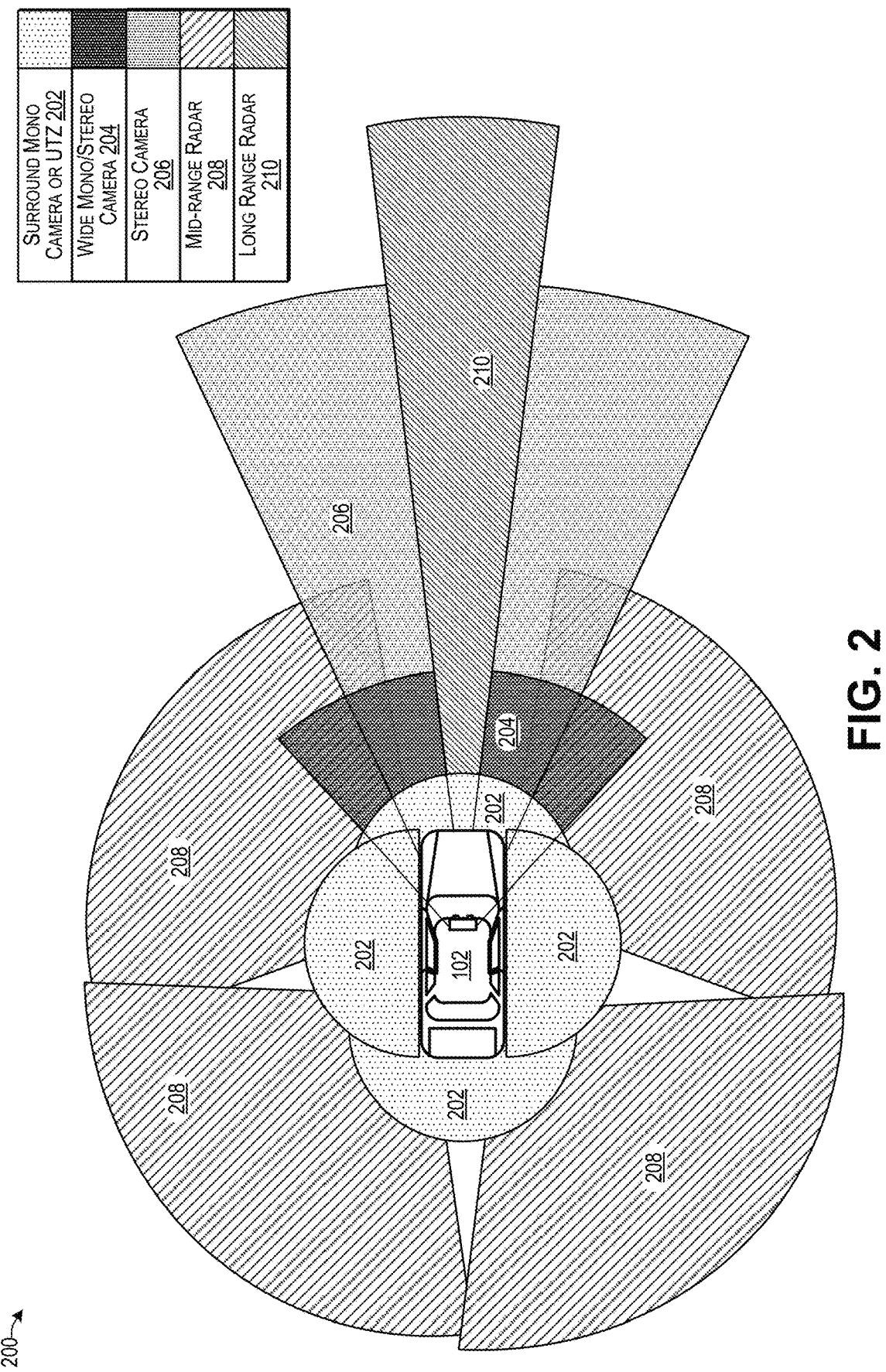
FIG. 2 illustrates an example sensor configuration according to some implementations.

FIG. 2 illustrates an example vehicle sensor configuration 200 according to some implementations. In this example, the vehicle 102 may be equipped with a wide range of sensors to detect and recognize roads, obstacles, signs, landmarks, and the like, along the travel path of the vehicle, as well as to navigate and avoid any collisions while partially or fully autonomous. For instance, as defined by the Society of Automotive Engineers (SAE), there are six levels of driving automation from Level 0 to Level 5. In particular, at "Level 0" (no driving automation) the driver performs all operating tasks like steering, braking, accelerating, and so forth. At "Level 1" (driver assistance), the vehicle can assist with some functions (e.g., cruise control), but the driver still handles all accelerating, braking, and monitoring of the surrounding environment. At "Level 2" (partial driving automation), the vehicle may assist with steering or acceleration functions and allow the driver to disengage from some of their tasks. Adaptive cruise control (ACC) is one example of Level 2 autonomy.

The concept of autonomous driving mainly starts from "Level 3" (conditional driving automation), in which the vehicle itself may monitor the surroundings and may exert some control over the vehicle (e.g., autonomous parking). At Level 3, a driver must be able to take over. At "Level 4" (high driving automation) a vehicle may be able to drive independently most of the time but will not operate unless all conditions are met. At "Level 5" (full driving automation) the vehicle is able to drive anywhere in all conditions. There is no need for pedals or a steering wheel, as the autonomous vehicle system controls all critical tasks, monitors the surroundings, and identifies unique driving conditions, such as traffic jams, obstacles, road closures, and so forth.

For the higher levels of automation (i.e., Level 3 to Level 5), the vehicle 102 may continuously monitor 360 degrees around the vehicle 102 to avoid any obstacles and navigate safely. There are various different kinds of sensors and sensing techniques that may be used for the vehicle 102 in such a situation. Commonly used sensors may include mono cameras, stereo cameras, infrared cameras, radar, lidar, lasers, ultrasonic sensors, GPS receivers, and so forth. For any specific driver assistance system application or any specific level of driving automation, the sensors may be selected based on the advantages and disadvantages of the sensor type, which may include detection range, type of detection ability, power requirements, cost, amount of data generated, and the like. Each sensor type may have advantages and disadvantages, and thus, different types of sensors may be combined in use on the vehicle 102 for improving accuracy in various weather or other types of conditions. For example, a single sensor type might not be able to meet recognition accuracy or range requirements in certain weather conditions.

As one example, a camera (mono/stereo) might not perform well in the dark or during inclement weather conditions, and the detection range may be comparatively low as compared to similarly priced radar sensors. However, a radar sensor might not be able to detect a human in the roadway and may have difficulty in detecting lane markers. On the other hand, a radar sensor may be a good candidate for long-range detection of other vehicles, as compared to other sensor types. As another example, an infrared camera may perform well under night conditions, but may also suffer from poor long-distance-detection capability. Additionally, a lidar sensor may perform well under night and day conditions, but may be costly and may generate huge amounts of data that may require a high capacity processor to process the data in real time. Further, while ultrasonic sensors are lower in cost than some other types of sensors, the detection range of ultrasonic sensors may be 10 meters or less, which may limit their usefulness.

In view of the foregoing, multiple different sensor types are typically employed for ADAS/AD vehicles to continuously monitor the vehicle surroundings. Commonly used sensors include mono camera, stereo camera, infrared camera, radar, lidar, laser, ultrasonic sensor, GPS, etc. For any specific driver assistance system application or any specific level of driving automation sensors are selected considering their advantages and disadvantages including range of motion, type of detection ability, power requirement, cost, amount of data generation, etc. Each sensor has its own advantages and disadvantages. It is often difficult to determine a single sensor that could meet the all-weather requirement considering recognition accuracy and range. Thus, automotive manufacturers use a single sensor or multiple sensor fusion system based on the level of autonomous driving systems as well as the cost. One of the examples of Level 2 ADAS application is Lane Keep Assist (LKA) system which is used for lane departure warning and lateral collision avoidance. An example of a sensor combination to realize 360 degrees monitoring around the vehicle for a Level 4 to 5 autonomous driving system is shown in FIG. 2. In addition, with the on-board sensors as shown in FIG. 2, vehicles may also be equipped with communication devices to share data with other vehicles, infrastructure, road edge computing modules, cloud data exchange and/or analytics platform, etc. Conventional cellular networks, DSRC, Wi-Fi, and the like, are communication protocols that may be used to communicate connected data between the vehicle 102 and other devices.

In FIG. 2, the example vehicle 102 is equipped with multiple different sensors for 360-degree monitoring of the vehicle surroundings. In this example, the vehicle 102 may be equipped with four surround mono cameras or ultrasound (UTZ) sensors, each having a respective approximate detection area 202 (front, back, left side, right side) as shown in FIG. 2. For example, mono cameras may have a sensing range of up to 10 m and may be useful for parking assistance, detecting close proximity obstacles and/or detecting pedestrians.

The vehicle 102 may also be equipped with a forward-facing wide-angle mono or stereo camera having an approximate detection area 204 in front of the vehicle 102. In addition, the vehicle 102 may be equipped with a forward-facing stereo camera having an approximate detection area 206 in front of the vehicle 102. Stereo camera-based vision sensing systems may be used for short/medium to long range recognition applications, such as for identifying and tracking different obstacles, landmarks, pedestrians, road signs, road features, traffic lights, etc., such as by using disparity maps or the like. Camera based sensing may be significantly affected by environmental conditions such as snow, rain, sunlight, darkness, etc.

Further, the vehicle 102 may be equipped with four mid-range radar sensors having respective approximate detection areas 208 surrounding the vehicle 102. Additionally, the vehicle 102 may be equipped with a long range radar sensor having an approximate detection area 210 in front of the vehicle 102. The radar sensors herein may employ milli-wave detection and ranging, and therefore may be robust to weather conditions, and may have a relatively long range of up to 250 m. However, radar-based measurements may lack detailed geometric information such as shape and size of an obstacle. In some examples, mid-range radar sensors may be useful for applications such as blind-spot assistance and emergency braking ADAS functions.

In some cases, a lidar sensor may be used in place of, or in addition to, one or more of the stereo camera, the long-range radar, or others of the above-discussed sensors. Further, while several example sensor configurations are discussed with respect to FIG. 2, numerous other sensor types, sensor locations, and sensor configurations will be apparent to those of skill in the art having the benefit of the disclosure herein. Accordingly, implementations herein are not limited to any particular sensor types, locations, or configurations.

In addition, with the onboard sensors herein, the vehicle 102 may be equipped with connected devices to share data with other vehicles, infrastructure, road edge computing modules, cloud data exchange, the analytics platform 145, and so forth. Generally, fully and partially autonomous vehicles that share data with other vehicles and systems may be referred to as a connected autonomous vehicle. Connected autonomous vehicles may receive data from the other sources as mentioned above and may process the received data to realize improved safety, comfort, efficiency, reduced travel times, and the like. Furthermore, connected vehicles may share the data with others to realize traffic density, road usage, etc., as well as provide different values to other vehicles.

Figure 3:
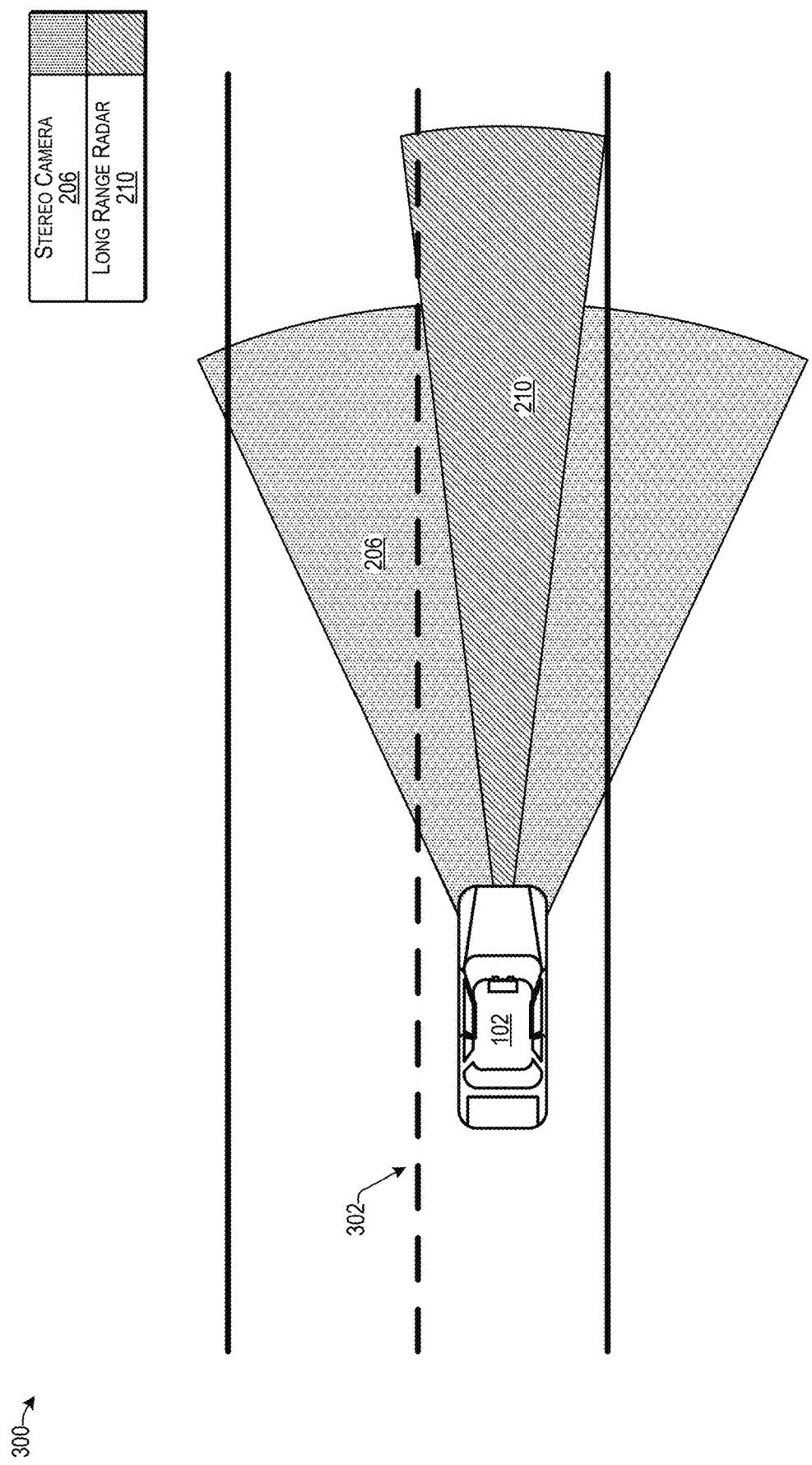
FIG. 3 illustrates an example sensor configuration according to some implementations.

FIG. 3 illustrates an example sensor configuration 300 according to some implementations. For instance, ADAS applications for lateral and longitudinal driver assist systems such as LKA and adaptive cruise control (ACC) are relatively mature technologies that are available in production vehicles. These systems typically use single or multiple sensors to ensure safe and robust performance. The type and number of sensors employed on a vehicle may vary based on the type of the ADAS application.

In the example of FIG. 3, the LKA system may be employed for lane departure warning and lateral collision avoidance. For instance, the LKA system may assist the driver in safely maintaining the vehicle 102 in its own lane. Accordingly, in this example, the sensor usage configuration includes the stereo camera providing the detection area 206 and the long-range radar providing the detection area 210. For example, the long-range camera's detection area 210 provides a field of view that is able to measure road curvature and provide localization of the vehicle 102 within its lane 302. In some examples, the LKA system may include an actuator (not shown in FIG. 3) to provide haptic feedback to the driver by vibration to the driver seat, steering wheel, or the like. Thus, the LKA system may support the driver by providing alerts of lane departure, and the driver may then be responsible for taking control of the vehicle 102 and avoiding further lane departure.

Additionally, in some examples herein, rather than relying on driver response when lane departure occurs, the LKA system may employ sensor fusion from the long-range camera and the long-range radar to alert the driver and also activate the steering actuator. Accordingly, the steering actuator may be automatically engaged to return the vehicle to its proper lane. The sensor fusion algorithms may be required to meet strict performance and safety requirements.

Figure 4:
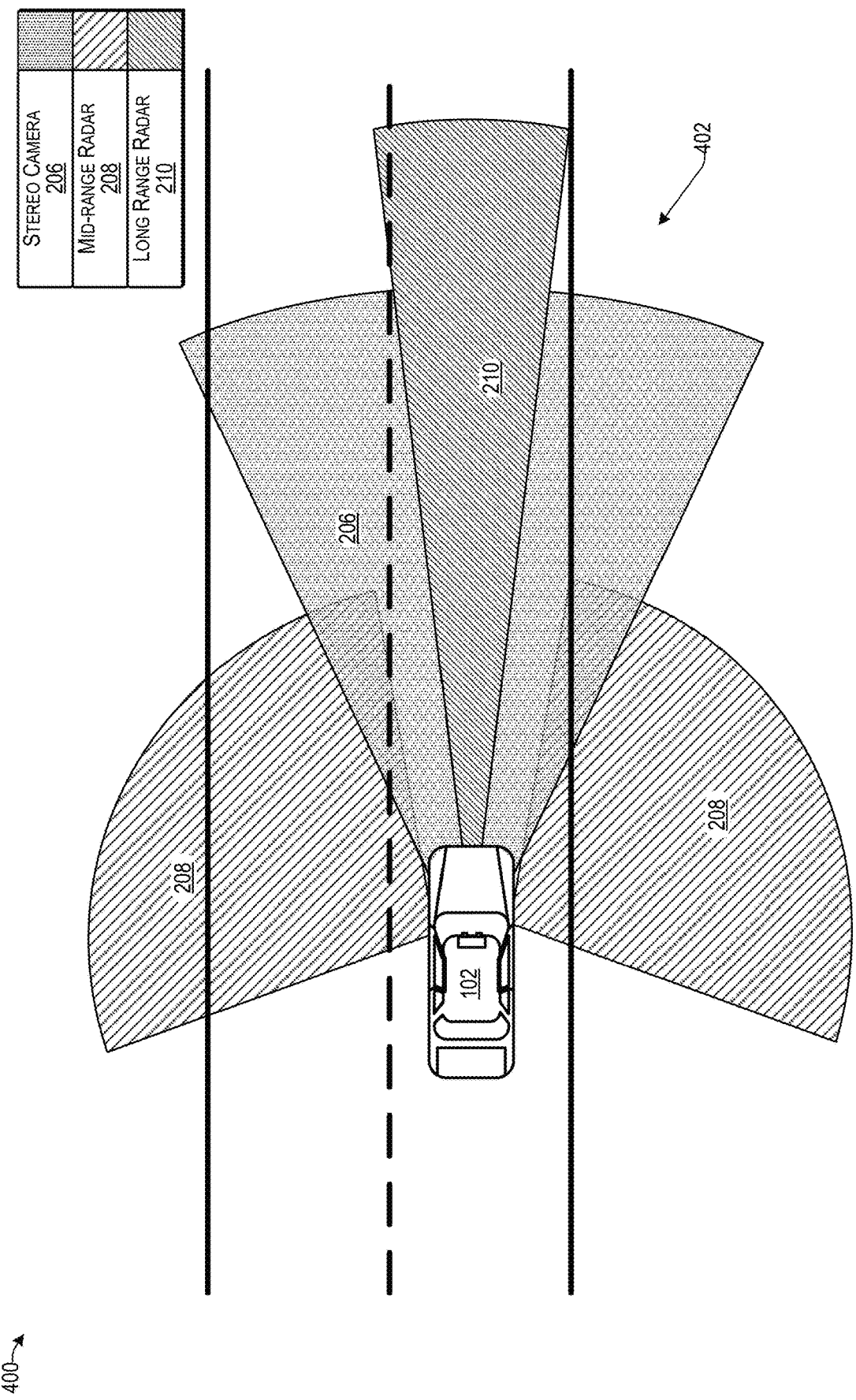
FIG. 4 illustrates an example sensor configuration according to some implementations.

FIG. 4 illustrates an example sensor configuration 400 according to some implementations. Adaptive cruise control (ACC) has a broader scope of longitudinal control functions than LKA systems and may be employed for front collision avoidance, traffic jam assistance in stop-and-go scenarios, as well as maintaining a proper following distance behind another vehicle during highway driving. The ACC system may automatically adjust the vehicle's speed and headway distance from the preceding vehicle. When the ACC system is engaged, the ACC system may ensure safe following distance and speed to aid the driver in avoiding accidents related to excessive speed or too short following distance. In the examples herein, the sensor configuration 400 for the ACC system may include a long-range radar with coverage area 210 having a long range FOV, two medium range radars with forward and side coverage areas 208 for obstacle detection with wide FOV, and the long range camera with the coverage area 206 having an FOV selected for lane detection and roadway detection. Accordingly, in this example, the coverage areas 206, 208 and 210 together may represent the vehicle sensor FOV 402 in the forward direction.

Although different sensors are widely used for different ADAS Levels 2 to 5 automated driving systems, it remains challenging to design a sensor configuration that optimizes cost and efficiency. Single sensor systems or sensor fusion systems used for level 2 and level 2+ ADAS applications are comparatively cheaper than the sensor combinations used for fully automated driving systems (level 4 to 5). In addition, ECUs used to process multi-sensor data for Level 4 to 5 systems are also more expensive than those used for Level 2 and 2+ systems. Although Level 2 and 2+ automated driving systems provide a cost-effective solution, the systems cannot offer fully automated driving during an entire route compared to that offered by a Level 4 or 5 AD system. However, the target of the research community is to bring ultimate safety for realizing zero collisions. To achieve that, implementations herein may be configured to ensure that the fully and partially automated vehicles use a route that provides the maximum amount of autonomous driving by taking into consideration the sensor configuration of the particular vehicle. A sensor and sensor fusion system used for a low level automated driving system such as Level 2+ may perform fully automated driving along certain roads but not all roads. Thus, examples herein may select a safest route for an automated vehicle that enables the vehicle to maximize its time of fully automated driving.

To determine the ability of a vehicle to traverse a particular road segment based on the available sensors, examples herein may determine a Precautionary Observation Zone (POZ) for each road segment of a candidate route. The POZ herein may include an area of potential obstacles, street signs, traffic signals, etc., that a fully or partially automated vehicle (which may include a robot, drone vehicle, or the like) should monitor using its onboard sensors for avoiding collision, meeting regulations, and ensuring safety. The details of a technique for determining one or more POZs for any route, as well as using the determined POZs for selecting an optimal route are discussed additionally below.

In some examples, a semi-automated-driving or fully-automated-driving vehicle is connected for communication with a data exchange and analytics platform, e.g., the data analytics platform 145 that may be provided, in part, by execution of the navigation information program 146 on the one or more service computing devices 108 in some implementations as discussed above with respect to FIG. 1. The vehicle may share its onboard sensor specifications, powertrain configuration information, destination, vehicle data, and so forth, with the data and analytics platform. The vehicle may exchange information with the data analytics platform directly or through roadside units (RSUs) that may include communication devices and, in some cases, service computing devices.

FIGS. 5, 8, 19, 20, and 21 include flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures, and the like, that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems, and devices described in the examples herein, although the processes may be implemented in a wide variety of other environments, systems, and devices.

Figure 5:
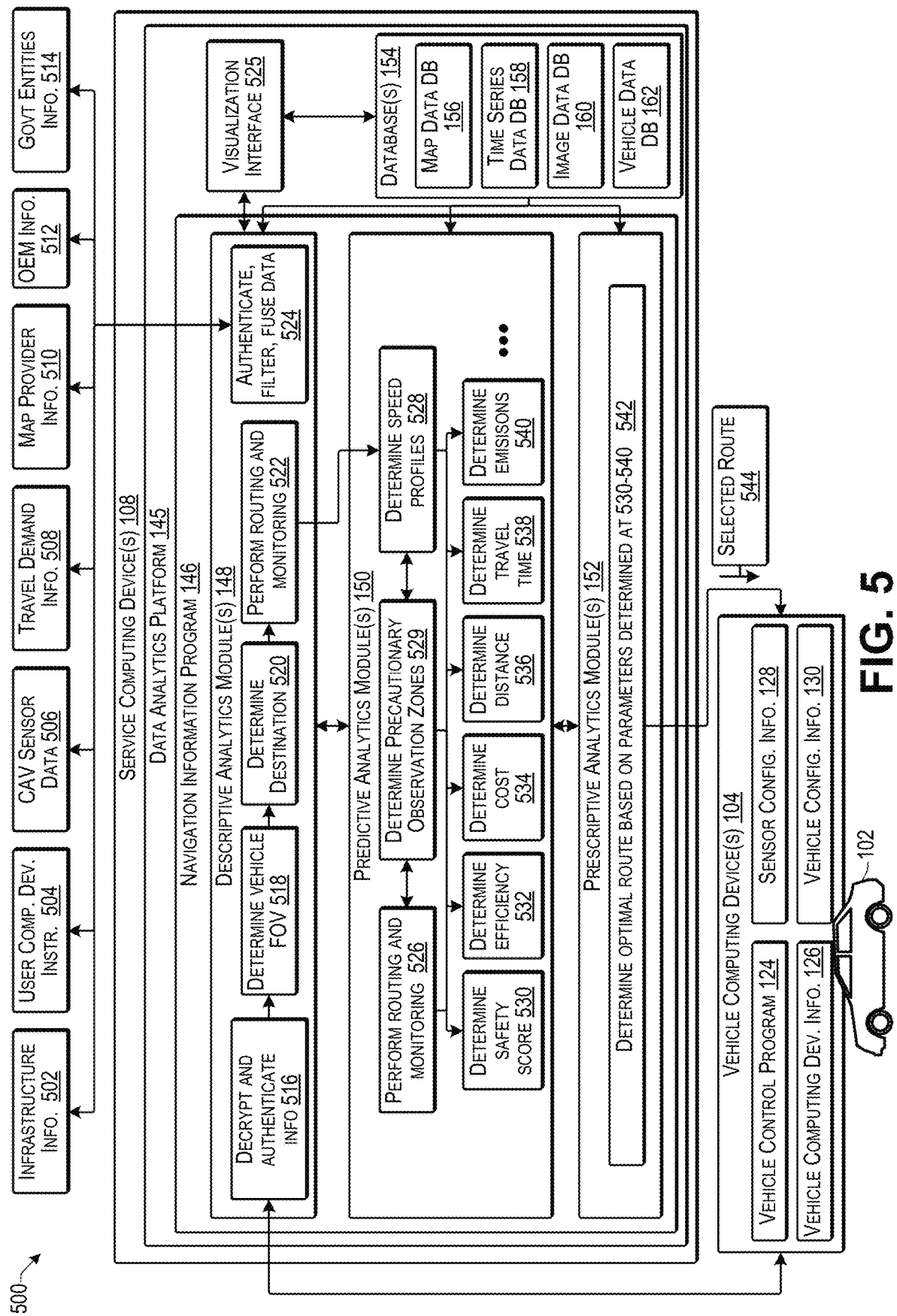
FIG. 5 is a combined flow diagram and block diagram illustrating an example architecture and process for selecting an optimal route for a vehicle according to some implementations.

FIG. 5 is a combined flow diagram and block diagram illustrating an example architecture and process 500 for selecting an optimal route for a vehicle according to some implementations. For instance, the example of FIG. 5 includes a detailed system architecture and data flow that may be used to identify a safe and efficient route for a connected vehicle by determining POZs along candidate routes and taking into consideration a vehicle's onboard sensor configuration, vehicle powertrain configuration, and other vehicle configuration information. In some cases, the architecture of FIG. 5 may correspond to the system 100 discussed above with respect to FIG. 1. The data analytics platform 145 receives the data from different sources such as vehicles, infrastructure sensors, cellphones, other transportation data services, and so forth. The data analytics platform 145 may process the received data to derive values for end users by using different artificial intelligence (AI) modules categorized in different analytics layers, including the descriptive analytics modules 148, the predictive analytics modules 150, and prescriptive analytics modules 152, as well as databases 154. Further, the data analytics platform 145 is able to share vehicle data with other third parties such as OEMs and may ingest data from third parties, such as map providers, into the data analytics platform 145.

In some examples, a portion of the process described may be executed by the vehicle computing device(s) 104, and another portion of the process may be executed by the service computing device(s) 108. Furthermore, while in this example, certain functions are being illustrated as being performed by one or the other of the computing devices 104 or 108, respectively, it will be readily apparent to those of skill in the art having the benefit of the disclosure herein that some of the functions may be performed by either of the computing devices 104 or 108.

The service computing device(s) 108 hosting the data analytics platform 145 may receive various types of information from various different sources and also may provide data to one or more of the sources. Examples include infrastructure information 502, user computing device instructions 504, CAV sensor data 506, travel demand information 508, map provider information 510, OEM information 512, and government entity information 514. As mentioned above, the infrastructure information 502 may include infrastructure camera images, and other information about infrastructure, road conditions, construction projects, and the like. Furthermore, the user computing device instructions 504 may include user preferences, user information, vehicle information, and the like received through a user computing device such as through a website or web app interface. Furthermore, the CAV sensor data 506 may include data received directly from vehicle sensors, such as connected sensors that automatically transmit data from the vehicle 102 to the service computing device 108.

The travel demand information 508 may provide an indication of possible road crowding based on current and expected demand, which may be based in part on scheduled holidays, air travel and rail travel ticket sales, sporting events and other types of event sales, and so forth. The map provider information 510 may include high definition and low definition maps as well as other information such as traffic data and the like. The OEM information 512 may provide various information about vehicles produced by particular OEMs such as powertrain information, fuel efficiency, and so forth. The government entity information 514 may indicate government provided safety information, traffic sign information, road construction information, road closure information, and so forth. In some examples, one or more data exchange application programing interfaces (APIs) may be employed for exchanging data with the above-discussed entities, such as for receiving data from the above-discussed entities or sending data to the above-discussed entities. Further, the above-discussed entities are only examples of entities with which information may be exchanged, or from which information may be received, and numerous other information entities will be apparent to those of skill in the art having the benefit of the disclosure herein.

As mentioned above with respect to FIG. 1, the databases 154 may include a map data database 156, a time series data database 158, an image data database 160, and a vehicle data database 162. Examples of information that may be maintained in the map data database 156 may include a map of the required FOV for candidate routes, a road profile map or other road profile information, a high definition map of a region in which the vehicle is located, and a standard map of the region in which the vehicle is located. Examples of information that may be included in the time series data database 158 may include information received through the vehicle CAN, vehicle sensor data, traffic data, weather data, and vehicle-to-everything (V2X) data. Examples of information that may be included in the image data database 160 may include infrastructure camera images, user cell phone camera images, and connected and automated vehicle (CAV) images. Examples of information that may be maintained in the vehicle data database 162 may include information about particular vehicles such as the vehicle sensor configuration information, vehicle computing device information, vehicle configuration information, vehicle occupant information, history, and preferences, and the like.

Furthermore, the vehicle 102 may send, to the service computing device 108, encrypted information about onboard sensor configuration information 128, as well as vehicle configuration information 130, such as ECU information, powertrain and chassis specification, and so forth. In some examples, the vehicle 102 may send this information to the service computing device 108 using a broadcasting protocol such as MQTT, UDP, or the like. Additionally, in some cases, the vehicle 102 may send source location information, such as a current location, and destination location information to the service computing device 108.

At 516, in the data analytics platform 145, the descriptive analytics module(s) 148 may decrypt the received vehicle data such as by using cryptographic hash algorithms such as MD5, SHA-1, SHA256, or other decryption techniques. Following decryption, the descriptive analytics module(s) 148 may authenticate or otherwise determine the identity of the vehicle and an occupant. For instance, the authentication process may confirm the data has been received from the correct connected car and may validate the integrity of the received data. In addition, the descriptive analytics module(s) 148 may access the vehicle data database 162 to retrieve any information about the vehicle or occupant maintained in the vehicle data database 162. Examples of information that may be retrieved may include the vehicle sensor configuration information 128 and/or vehicle configuration information 130 that may have been previously received for the vehicle 102, as well as user preferences, routing preferences, etc., for an owner of the vehicle or other occupant of the vehicle. Additionally, although not shown in FIG. 3 for clarity of illustration, other processes performed by the data analytics module(s) 148 may include data parsing, data fusion, and the like. For example, a data parsing process may parse an incoming message from the vehicle 102 to a JSON format for further processing, which may include detecting and correcting any corrupt messages sent from the vehicle. Further, a data filtering and fusion process may preprocess the data transmitted from the vehicle and update the databases 154 accordingly.

At 518, the descriptive analytics module 148 may determine the vehicle FOV from the vehicle sensor configuration information 128. In some examples, the sensor configuration information 128 may be received from the vehicle 102, while in other examples, the sensor configuration information 128 may be received from the vehicle data database 162. For example, the sensor configuration information 128 may be unlikely to change substantially over time and therefore, having been received previously and stored in the vehicle data database 162, does not need to be transmitted by the vehicle 102 every time a route is to be determined.

At 520, the descriptive analytics module(s) 148 may determine whether a destination location is specified in the received and decrypted vehicle data. If the vehicle destination is available in the decrypted vehicle data, the process goes to 522 to perform routing and monitoring. In some cases, the system may prompt the vehicle occupant for the destination, which may result in the destination being received via voice recognition or other user input. On the other hand, if the vehicle destination is not included in the received information and is not provided by the vehicle occupant, the process may go to 526 to perform the routing and monitoring with prediction of the destination location.

At 522, descriptive analytics module(s) 148 may execute a routing and monitoring algorithm that accepts inputs of vehicle source location, destination location, map, traffic and weather data, and determines candidate routes for the vehicle to reach the destination location. For instance, real-time traffic may be updated using a time loop that executes at a fixed time interval and obtains traffic data from a third party. The traffic data may be ingested in the database and sent to the routing and monitoring algorithm. The routing and monitoring algorithm may be executed by either the descriptive analytics module(s) 148 or the predictive analytics module(s) 150, which may be alternatively invoked based on whether the destination location has been provided or needs to be predicted. If the destination location is not available to the descriptive analytics module(s) 148, the routing and monitoring algorithm may be executed by the predictive analytics module(s) 148 based on use of an AI-based model to predict the destination location, such as by considering the vehicle occupant's history, time of the day, vehicle location, and the like. After the destination location is predicted and, optionally, confirmed by the vehicle occupant, the routing and monitoring algorithm may be executed to generate candidate routes to the destination location as discussed additionally below with respect to 526.

At 524, the descriptive analytics module(s) 148 may further receive the data from the various external sources 502-514, and may perform authentication, filtering, and/or fusing of the received data. For example, the data analytics platform 145 may use data filtering and data fusion to ingest various types of time series and image data obtained from traffic infrastructure, user smartphones, third parties, and so forth. The data may be ingested and stored in the databases 154 or the like. As several non-limiting examples, the data may be managed using a combination of SQL (Structured Query Language) and non-SQL databases for achieving superior real-time performance of the data analytics platform 145.

At 526, in the case that the destination location is not included in the received information received from the vehicle 102, the predictive analytics module(s) 150 may predict the destination location, such as by using a machine learning model, a rule-based model, or the like, and/or based on a vehicle occupant profile, historic trip data, time-of-day, and/or other information stored in the vehicle data database 162. The predicted destination may be sent by the service computing device 108 to a voice assistant or other human-machine interface associated with the vehicle computing device 104. As one example, an interactive voice request may be sent to the vehicle occupant for obtaining confirmation of the predicted destination. The predictive analytics modules 150 may receive a confirmation of the predicted destination location or a user input that indicates an alternative destination location. Following determination of the destination location, the predictive analytics module(s) 150 may perform routing and monitoring to determine candidate routes between the source location and the destination location. An example of determining candidate routes is discussed, e.g., with respect to FIG. 6.

At 528, the service computing device may determine a speed profile for each of the candidate routes. The speed profile algorithm may predict vehicle speed for each candidate route and may therefore be performed by the predictive analytics module(s) 150. The speed profile algorithm may receive the most updated vehicle routes from the routing and monitoring algorithm in the predictive or descriptive analytics layers. For every road segment of the route, the vehicle speed may be predicted using a speed prediction model, which may include one or more of machine-learning models, statistical models, or rule-based models. Additional inputs to the speed prediction model may include real-time traffic and trip history of the current road segment. The real-time traffic speed may be obtained from a third party data provider, such as the map data provider or the like. The speed profile for the candidate route may be obtained by storing the predicted speed for each road segment in the respective candidate route. Further, this process may be executed for all of the candidate routes. An example algorithm for determining the speed profile is discussed additionally below with respect to FIG. 20.

At 529, after the candidate routes are determined between the source location and the destination location, the computing device may divide the candidate routes into segments and may determine a POZ for each segment of each candidate route. For example, after the data analytics platform 145 identifies the destination of a connected vehicle, a POZ determination algorithm may be executed to determine an area of a potential obstacle, a sign, a traffic signal, or the like, for each road segment of each of the candidate routes that a fully or partially automated vehicle (which may include a robot, drone, etc.) may need to monitor using its onboard sensors for avoiding a collision, meeting regulations, and ensuring safety. As mentioned above, each candidate route may be divided into several road segments which are the distance between two waypoints/nodes. Road waypoints or nodes may be defined based on a high definition map or standard map that may be included in the map database of FIG. 5. The route waypoints as well as the road segments may be defined by the routing and monitoring process herein. However, determining these features may also be performed by the precautionary observation zone (POZ) process of FIG. 5. The main task of the POZ process may be to calculate the required observation zone volume for each road segment that an automated vehicle should monitor when traversing the road segment.

In some cases, the processes performed by the predictive analytics module(s) 150 may be categorized into two different hierarchical levels. For example, the routing and monitoring 526, precautionary observation zone determination 529, and the speed profile determination may correspond to a first hierarchical level. Furthermore, determination of various different parameters may correspond to a second hierarchical level. The objective of the processes in the first hierarchical level may be to determine the features that are required for determining the various parameters in the second hierarchical level. The parameters may then be considered for selecting an optimal route. Determining the parameters may include determining a safety score 530, determining efficiency 532, determining cost 534, determining distance 536, determining travel time 538, determining emissions, and so forth. These parameters may be determined for each of the candidate routes. In some examples, the determined parameters may be provided to the prescriptive analytics module(s) 152 to identify the best or otherwise optimal route to the destination.

At 542, the candidate routes and associated parameters determined at 530-540 may be sent to the prescriptive analytics module(s) 152. The prescriptive analytics module(s) 152 may determine and then output an optimal route based on the parameters associated with each optimal route. In some examples, the prescriptive analytics module(s) 152 may determine the optimal route based at least in part on the process set forth in FIG. 20, although implementations herein are not limited to the process of FIG. 20.

At 544 the service computing device 108 may send a selected optimal route to the vehicle computing device 104. The vehicle computing device 104 may provide the selected route to the vehicle control program 124 of the vehicle 102 for use in navigating to the destination location.

Figure 6:
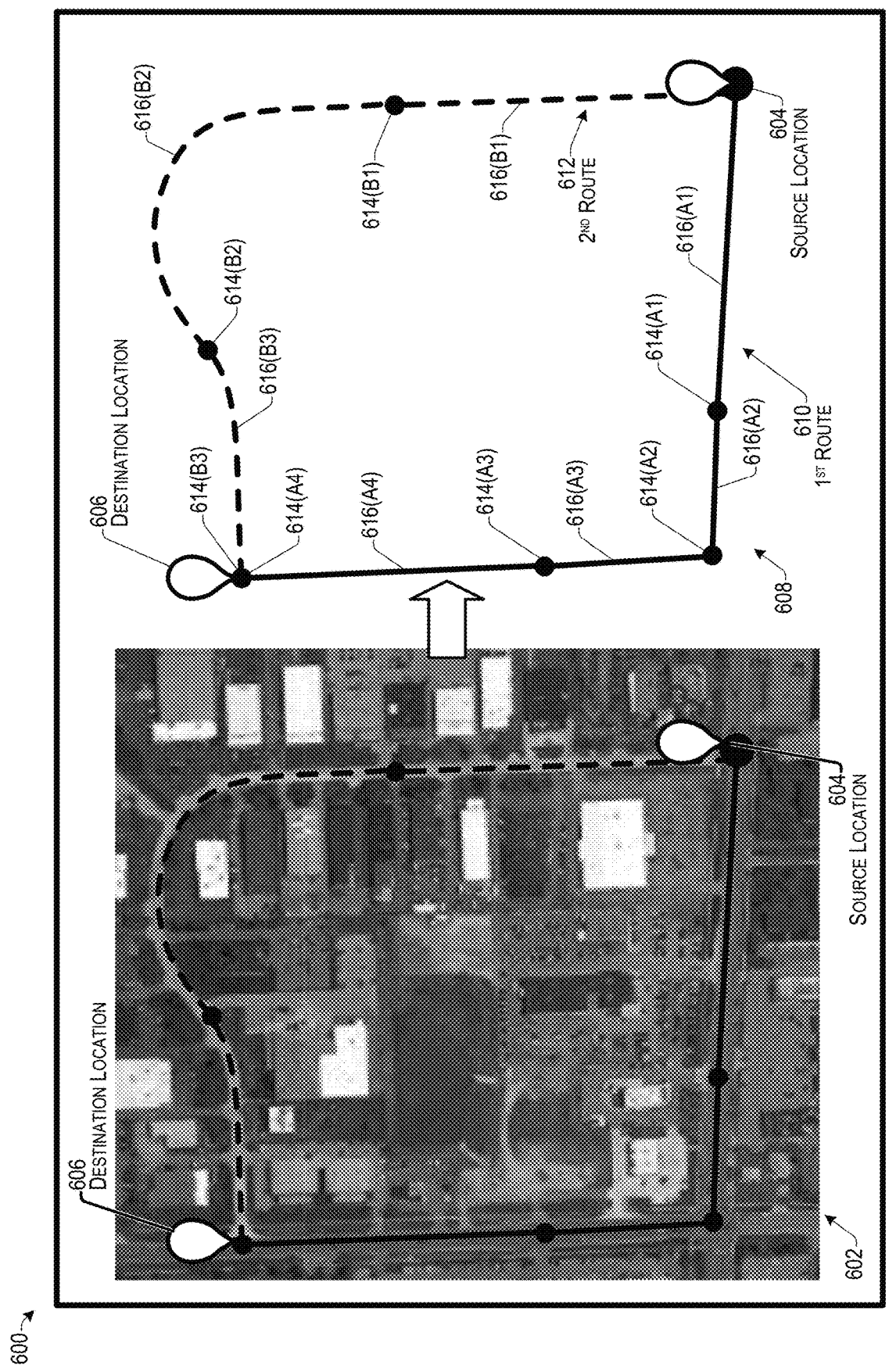
FIG. 6 illustrates an example of determining candidate routes between a source location and a destination location according to some implementations.

FIG. 6 illustrates an example 600 of determining candidate routes between a source location and a destination location according to some implementations. In this example, as shown on a map 602, a source location 302 and a destination location 304 may be initially determined, e.g., as discussed above and as discussed additionally below. For example, after the source location 604 and the destination location 606 have been set, a plurality of feasible candidate routes 608 may be determined. In this example, two feasible candidate routes 608 are illustrated, namely a first route 610 and a second route 612. In other examples, more or fewer candidate routes may be determined. In addition, in the case that there are a very large number of feasible candidate routes, the number of candidate routes may be narrowed using any of various thresholds such as estimated distance traveled along each route, estimated time of travel for each route, or the like. In some cases, the narrowing criteria may be based at least in part on user preferences.

Each route 610 and 612 may be divided into a plurality of segments based on nodes 614 and intervening road segments 616 which are the distance between two waypoints 614. The locations of the waypoints 614 and the length of each road segment 616 may depend in part on the types of roads to be traversed. For instance, road segments 616 may vary from a few meters to several hundred meters or more. In some cases waypoints 614 may correspond to intersections however this is not necessarily always the case, such as in the case of long stretches of road that may be broken into shorter road segments.

In the illustrated example, the first route 610 is divided into four road segments including waypoints 614(A1), 614(A2), 614(A3), and 614(A4), and road segments 616(A1), 616(A2), 616(A3), and 616(A4). In addition, the second route 612 is divided into three road segments including waypoints 614(B1), 614(B2), and 614(B3), and road segments 616(B1), 616(B2), and 616(B3). As mentioned above, in other examples, a different number of road segments might be used for each of the routes 610, 612. Furthermore, while the map 602 is illustrated in FIG. 6 for discussion purposes, in operation it may not be necessary for the service computing device 108 to generate a visual map for performing the identification and analysis of the selected routes and road segments.

The data analytics platform 145 may store data in advance for each waypoint 614 and/or road segment 616 for all candidate routes or at least the most feasible candidate routes within a geographic region. For example, the data analytics platform 145 may analyze maps of geographic regions in advance for determining routes and possible waypoints and road segments on the roads included in each map. This information may be stored in the map data database 156 discussed above with respect to FIG. 1 in advance of receiving a request for route guidance from a vehicle.

Furthermore, for the determined road segments 616 identified in each map, the data analytics platform 148 may determine and store the POZ for each respective road segment 616. For example, once the road segments for each route have been calculated, the data analytics platform 145 may calculate the number of road intersections and corresponding intersection functional areas. In the examples herein, an intersection may include two areas: a physical area of intersection and a functional area of intersection. The POZ may be calculated for each intersection, and may include a 3D zone that should be monitored by a human driver or vehicle sensors when navigating on that respective road segment 616. For instance, an autonomous vehicle may be expected to monitor the POZ for safely driving autonomously on the respective road segment 616.

In this routing example, as discussed additionally below, for the first route 610 and the second route 612, the data analytics platform 145 may execute the POZ determination process in the analytics layer to determine the POZs for each segment of each route 610, 612. The data analytics platform 145 may determine a safety score for each route 610, 612, such as based on the process 1900 discussed with respect to FIG. 19 below. For example, determining the safety score may include comparing the POZ with the vehicle sensor FOV for the particular vehicle to determine a percentage of overlap between the POZ for each segment and the vehicle sensor FOV. The vehicle sensor FOV may be calculated by the data analytics platform 145 based on the vehicle onboard sensor configuration information 128 received by the data analytics platform 145 for the vehicle 102, such as discussed above with respect to FIG. 5.

Furthermore, in addition to determining a safety score for each candidate route, the data analytics platform 145 may further determine a drive horizon for each candidate route that may identify energy efficiency of the candidate routes by considering vehicle powertrain model and other vehicle information, road gradient, weather, traffic, and the like. In addition, the data analytics platform 145 may also determine predicted vehicle dynamics for each route. For example, the vehicle dynamics may indicate a predicted amount of dynamic forces that may be applied to a vehicle occupant while the vehicle traverses each route, such as by determining vehicle jerk, roll, pitch, yaw, crash safety, autonomous driving duration, and the like. The safety score, the drive horizon results, and the vehicle dynamics results may be processed by the prescriptive analytics module(s) 152 to select the optimal route for the particular vehicle to the desired destination location 606.

Figure 7A:
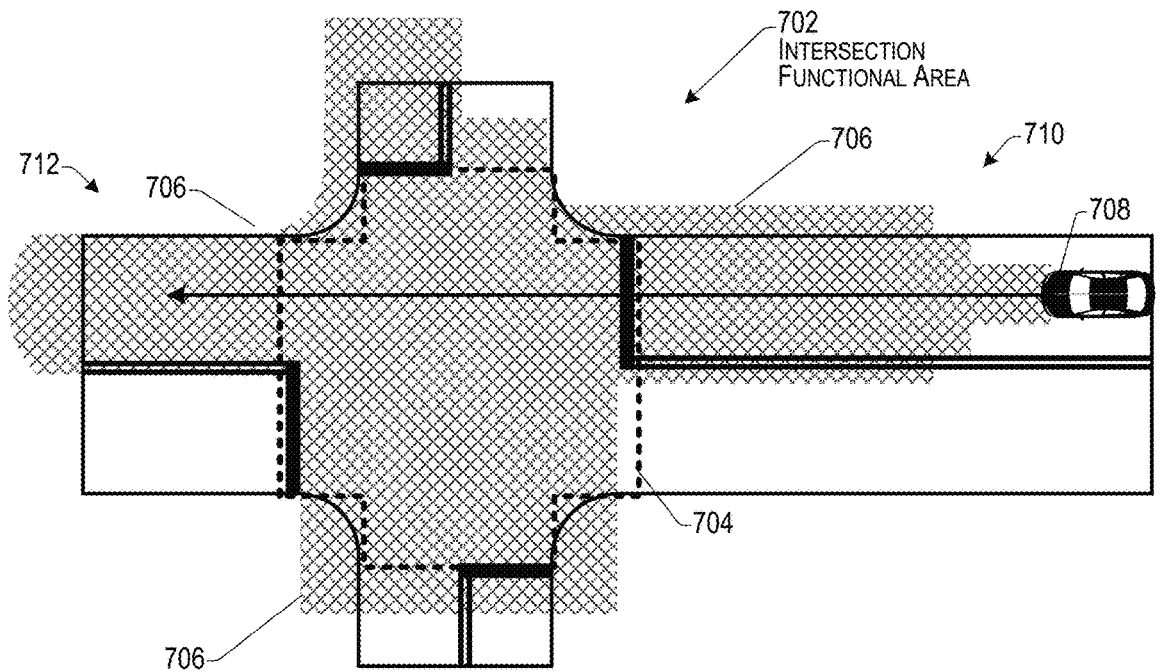
FIGS. 7A and 7B illustrate example intersections according to some implementations.
Figure 7B:
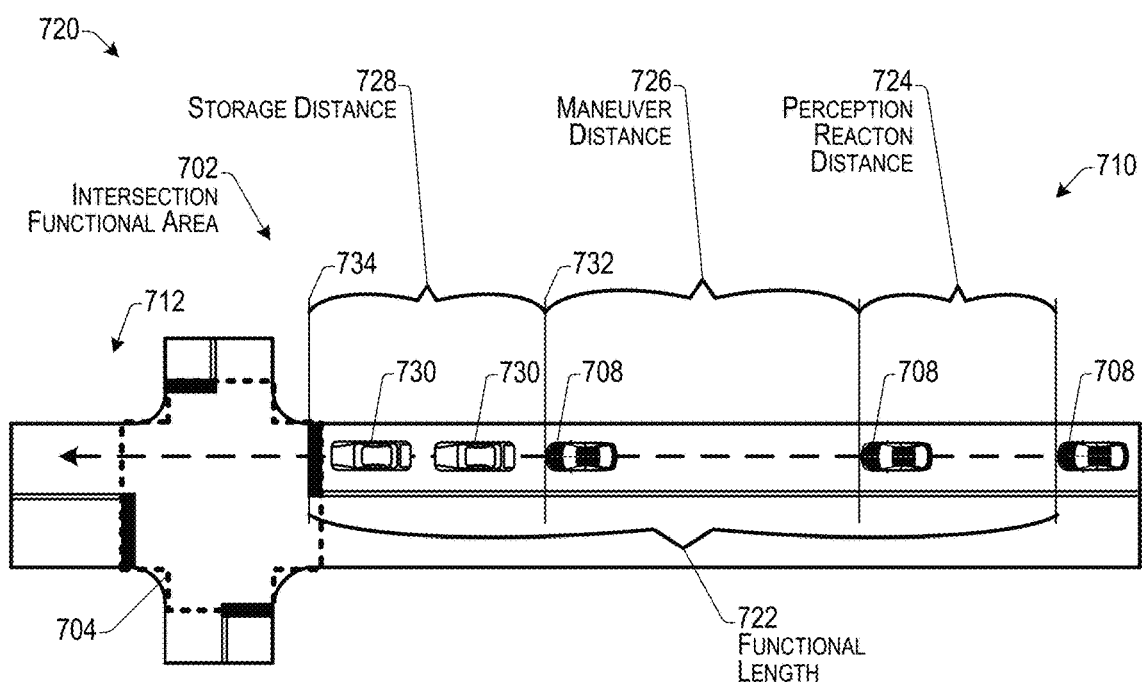

FIGS. 7A and 7B illustrate examples of intersections according to some implementations. FIG. 7A illustrates an example intersection 700 according to some implementations. The intersection 700 includes an intersection functional area 702 indicated by cross hatching. The intersection functional area 702 may include the crosshatched region that includes both an intersection physical area 704 of the intersection (indicated by dashed line), and the additional areas 706 outside of the intersection physical area 704 in which a vehicle 708 may maneuver. Thus, the intersection physical area 704 may correspond to the fixed area within the four corners of the intersection 700. On the other hand, the overall functional area 702 may be variable and may include an upstream portion 710 and a downstream portion 712 as shown in FIG. 7A.

FIG. 7B illustrates an example intersection 720 according to some implementations. As mentioned above, contrary to the fixed physical area 704 of the intersection 720, the intersection functional area 702 is variable and includes both upstream portion 710 and downstream portion 712 in addition to the physical area 704. The upstream area 710 of the intersection functional area 702 includes a functional length 722. The functional length 722 may be divided into several portions, such as when a vehicle 708 approaches the intersection 720 and during which the vehicle 708 decelerates and comes to a complete stop. These portions include a perception reaction distance 724 and a maneuver distance 726. In addition, the functional length 722 may include a storage distance 728, which may be a portion of the intersection functional area 702 in which other vehicles 730 are queued.

Realizing safety at intersections may be accorded a high priority as accidents mostly happen at intersections. At the intersection, a human driver may understand where to make the lane changes, when and how to read the traffic light, location to stop, where to watch before making a turn, when and speed to make the turn, etc. An automated vehicle should have the ability to follow the sequential steps and observe the proper region to make human-like decisions. Thus, an automated vehicle should understand the different regions at intersections, such as those specified by government, local authorities, etc., and perform the same action for each region as a human driver would. The intersection functional area calculation depends on the road speed limit, location, type of road, etc. which may be defined by designated authorities in each country. In the USA, according to the AASHTO (American Association of State Highway and Transportation Officials) intersection functional length (F) is the sum of stopping sight distance (S) plus the storage length distance (Q) as shown in EQ(1). In case there is no traffic, storage length (Q) becomes zero and intersection functional area becomes the stopping sight distance. The stopping sight distance is the combination of the distances traveled by a vehicle during two phases to stop the vehicle, i.e., a first phase is the perception reaction distance 724 traveled during perception reaction time and the second phase is the maneuver distance 726 traveled during a maneuver time:

$$F=S+Q \qquad \text{EQ(1)}$$

$$S=(1.47*V*t)+1.075*(V^2/a) \qquad \text{EQ(2)}$$

where,
F=Intersection functional length
S=Stopping sight distance
Q=Storage or queue length
V=Design speed (mph)
t=Perception reaction time (2.5 Sec)
a=Deceleration rate (within 11 to 15 ft/sec$^2$, e.g., 11.2 ft/sec$^2$).

The first part of EQ(2) indicates the distance covered during the perception reaction time during which the driver traverses the perception reaction distance 726, realizes that a decision is needed, and decides what kind of maneuver is appropriate. The perception reaction time may typically be about 2.5 seconds, which includes about 1.5 seconds for perception and about 1.0 seconds for reaction. The second part of EQ(2) indicates the distance traveled by the driver during the maneuver distance for decelerating the vehicle and coming to a complete stop, e.g., at 732 when there are other cars 703 in the storage distance 728, or at 734 when there are no other cars in the storage distance 728.

Figure 8:
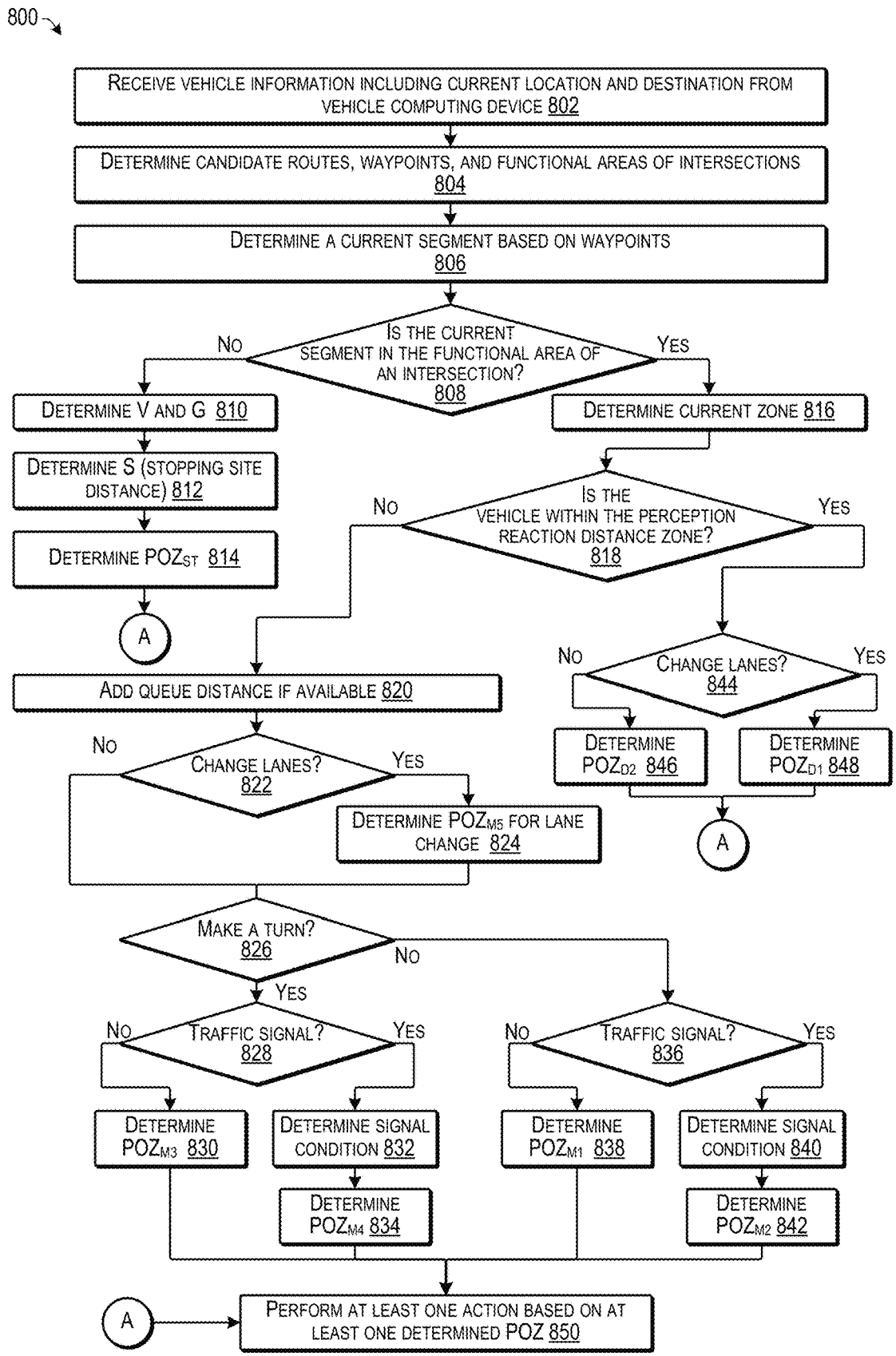
FIG. 8 is a flow diagram illustrating an example process according to some implementations.

FIG. 8 is a flow diagram illustrating an example process 800 for determining POZs for various different criteria according to some implementations. In some examples, the process 800 may be executed by the system 100 discussed above. For example, the process 800 may be executed by the data analytics platform 145, such as the service computing device(s) 108 executing the navigation information program 146 in some examples. Once a connected vehicle shares its current location and destination, the corresponding road segments may be calculated by the data analytics platform 145 for all the candidate routes to the destination location. The road segments may be divided into two categories: (1) road segments outside of any intersection functional area and (2) road segments inside of an intersection functional area. The POZ determining process 529 of the predictive data analytics layer may first identify the type of road segments and may then calculate the POZ for that road segment. The system may determine at least one POZ for each road segment of each candidate route.

At 802, the service computing device 108 may receive vehicle information including current location and destination from the vehicle computing device.

At 804, the service computing device 108 may determine candidate routes, waypoints, and functional areas of intersections.

At 806, the service computing device 108 may determine a current segment based on waypoints.

At 808, the service computing device 108 may determine whether the current segment is in the functional area of the intersection. If so, the process goes to 816. If not, the process goes to 810.

At 810, the service computing device 108 may determine V (design speed) and G (road grade) for the current segment.

At 812, the service computing device 108 may determine the stopping sight distance S based on the values for V and G determined at 810 (see EQ(5) below).

At 814, the service computing device 108 may determine $POZ_{ST}$ for the current segment.

At 816, when the current segment is in the functional area of an intersection the service computing device 108 may determine a current zone of the functional area, e.g., the perception reaction distance zone, the maneuver distance zone, or the storage distance zone.

At 818, the service computing device 108 may determine whether the vehicle is within the perception reaction distance zone. If so, the process goes to 844. If not, the process goes to 820.

At 820, when the vehicle is within the functional area of the intersection but not within the perception reaction distance zone, the service computing device 108 may add the storage queue distance if available.

At 822, the service computing device 108 may determine whether the vehicle should change lanes such as based on the intended destination. If so, the process goes to 824 if not, the process goes to 826.

At 824, if the vehicle should change lanes, the service computing device 108 may determine $POZ_{M5}$ for the lane change.

At 826, the service computing device 108 may determine whether the vehicle should make a turn. If so, the process goes to 836. If not, the process goes to 838.

At 828, if the vehicle will be making a turn at the intersection, the service computing device 108 may determine whether there is a traffic signal. If so, the process goes to 832. If not, the process goes to 830.

At 830, when there is not a traffic signal, the service computing device 108 may determine $POZ_{M3}$ for the intersection.

At 832, when there is a traffic signal, the service computing device 108 may determine the condition of the traffic signal.

At 834, based on the determined condition of the traffic signal, the service computing device 108 may determine $POZ_{M4}$ for the intersection.

At 836, if the vehicle will not be making a turn at the intersection, the service computing device 108 may determine whether there is a traffic signal. If so, the process goes to 840. If not, the process goes to 838.

At 838, when there is not a traffic signal, the service computing device 108 may determine $POZ_{M1}$ for the intersection.

At 840, when there is a traffic signal, the service computing device 108 may determine the condition of the traffic signal.

At 842, based on the determined condition of the traffic signal, the service computing device 108 may determine $POZ_{M2}$ for the intersection.

At 844, when the vehicle is within the perception reaction distance zone, the service computing device 108 may determine whether the vehicle should change lanes. If so, the process goes to 848. If not, the process goes to 846.

At 846, when the vehicle was not going to change lanes, the service computing device 108 may determine $POZ_{D2}$ for the current lane.

At 848, when the vehicle is going to change lanes, the service computing device 108 may determine $POZ_{D1}$ for the new lane.

At 850, following determination of the POZ at one of 830, 834, 838, 842, 846, or 848, the service computing device 108 may perform at least one action based on at least the POZ, such as sending at least one signal, determining a POZ for a next segment of the candidate route, or the like.

Figure 9:
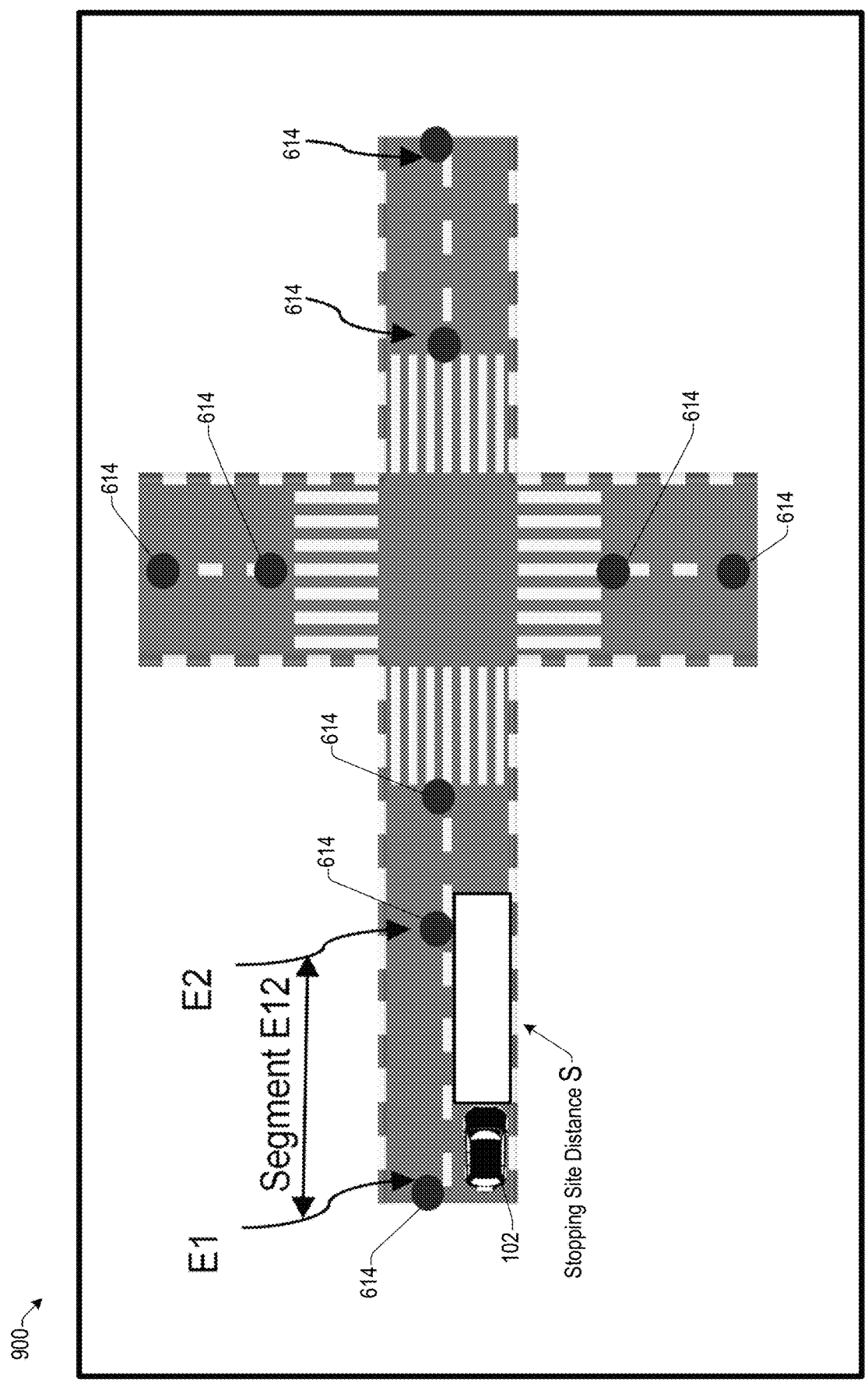
FIG. 9 illustrates an example of determining $POZ_{ST}$ in which a current road segment is located outside of an intersection functional area according to some implementations.

FIG. 9 illustrates an example of determining $POZ_{ST}$ in which a current road segment falls outside of an intersection functional area according to some implementations. In this example, the vehicle 102 is located between a first waypoint 614 designated as E1 and a second waypoint 614 designated as E2. A plurality of other waypoints 614 are also illustrated in this example. Accordingly a road segment between the waypoints E1 and E2 may be designated as segment E12 in this example. Further, suppose that the road segment E12 is located outside the intersection functional area discussed above with respect to FIGS. 7A and 7B. When a road segment is located outside of an intersection functional area, stopping sight distance S for that road segment may be calculated as shown in EQ(3):

$$S=(1.47*V*t)+1.075*(V^2/a) \qquad EQ(3)$$

where,

S=Stopping sight distance
V=Road design speed (mph)
t=Perception reaction time
a=Deceleration rate In addition, EQ(3) can be rewritten as shown in EQ(4) based on the typical values of t=2.5 sec and a=11.2 ft/sec$^2$:

$$S=3.675*V+0.096*V^2 \qquad EQ(4)$$

Additionally, in the situation that the road is on a grade G, the stopping sight distance S can take the grade into consideration and may be calculated as shown in EQ(5):

$$S=3.675*V+V^2/[30((a/32.2)\pm G/100)] \qquad EQ(5)$$

In some cases, the road design speed V and road grade G can be either stored in the data analytics platform 145 database(s) 154 for all routes or can be collected in real-time through third party services. Once the stopping sight distance S is calculated, the three-dimensional (3D) region of $POZ_{ST}$ for the road segment outside the intersection functional area may be calculated as shown in FIG. 10 below, such as based on a lane width of 12 feet and a height of 3.5 ft.

Figure 10:
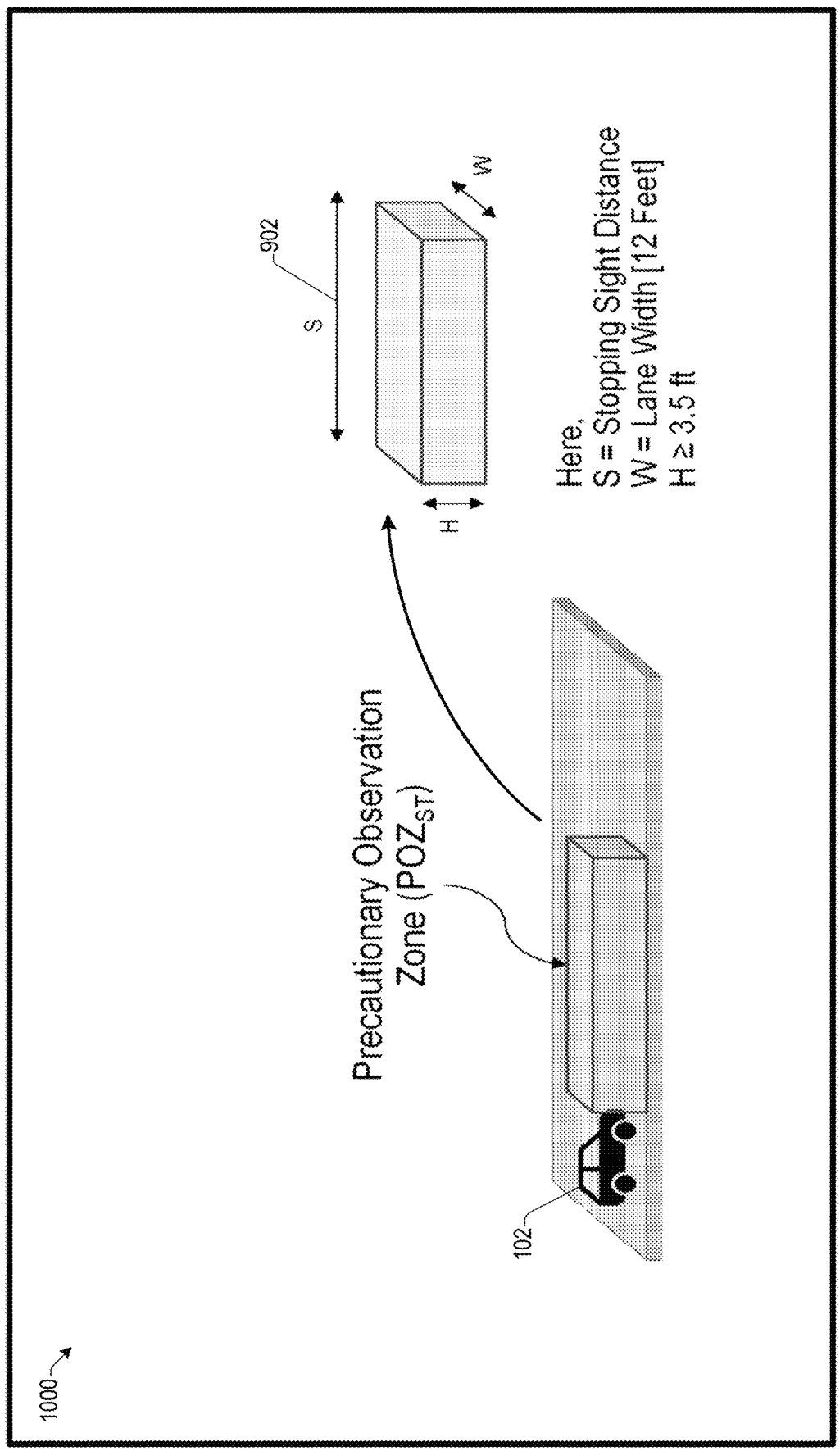
FIG. 10 illustrates an example of determining $POZ_{ST}$ according to some implementations.

FIG. 10 illustrates an example 1000 of determining $POZ_{ST}$ according to some implementations. In this example, for road segments outside of intersection functional areas, the POZ is designated as $POZ_{ST}$, and may be determined as a volume in 3D space having a length corresponding to the stopping site distance S determined above with respect to FIG. 9; a width W corresponding to the width of the travel lane in which the vehicle 102 is traveling (or will travel), which in this example is a default value of 12 feet; and a height H, which in this example is a default height greater than or equal to 3.5 feet. In some examples, the height H may vary based on any of various factors, such as height of the vehicle, height of expected obstacles, signs, or signals, and so forth.

Figure 11:
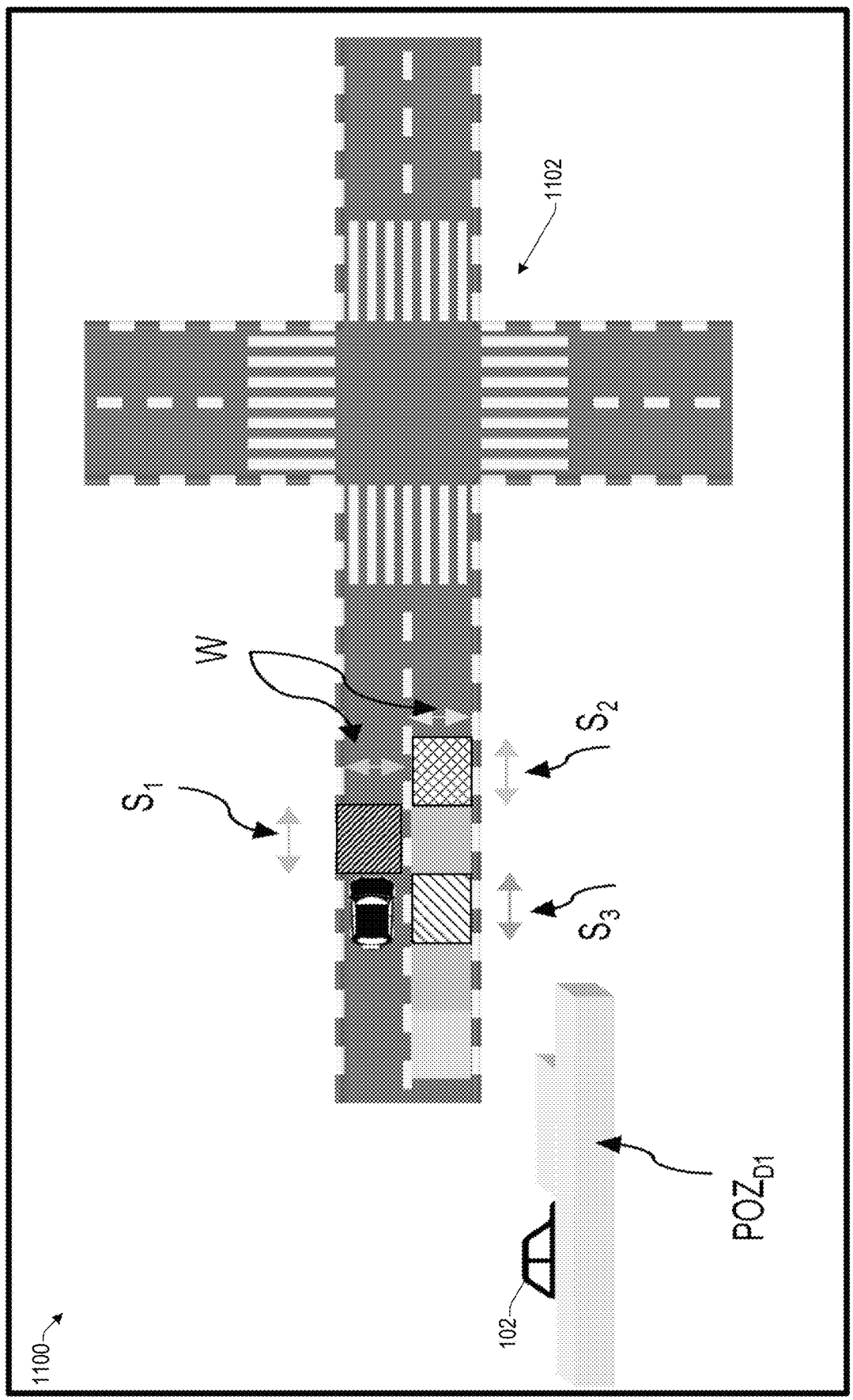
FIG. 11 illustrates an example of determining $POZ_{D1}$ in which the road segment is inside an intersection functional area according to some implementations.

FIG. 11 illustrates an example 1100 of determining $POZ_{D1}$ in which the road segment is inside an intersection functional area according to some implementations. In this example, suppose that the road segment under consideration is inside the intersection functional area of an intersection 1102. The system may determine whether the location of the road segment is in the perception reaction distance zone or ahead of the perception reaction distance zone (e.g., in the maneuver distance zone and/or storage distance zone) as discussed above with respect to FIG. 7B. In the case that the road segment is within the perception reaction distance zone of the intersection functional area, the system may determine whether the vehicle needs to make lane change or not, such as based on the next road segments of the current route to the destination. If a lane change is required, the system may decide the direction of a turn based on the next segment, in addition to determining a $POZ_{D1}$ for the current road segment as below.

In the example of FIG. 11, suppose that the vehicle is currently in the left lane, but needs to change lanes to the right lane, such as to make a right turn at the intersection 1102. Calculation of the $POZ_{D1}$ when the vehicle changes lanes from left to right includes a determination of the lengths of $S_1$, $S_2$, and $S_3$. In this situation, the distances $S_1$, $S_2$, and $S_3$ may be calculated as shown below:

$$S_1=(1.47*V*t) \qquad EQ(6)$$

$$S_2=1.075*(V^2/a) \qquad EQ(7)$$

$S_3$=Length of ego vehicle

W=Lane width (12 ft)

H=3.5 ft

Thus, the distances $S_1$ and $S_2$ are determined as shown in EQ(6) and EQ(7), respectively, when the vehicle will be changing lanes from the left lane to the right lane. The distance $S_3$ is equal to the length of the vehicle. Consequently, a 3D volume may be determined as the $POZ_{D1}$ for the current segment based on 12 ft width of lane and 3.5 height of driver eye distance from road. If the current segment is within the perception reaction distance zone and lane change is not required, $POZ_{D2}$ may be determined the same way as $POZ_{ST}$ and the stopping sight distance may be calculated as discussed above based on EQ(3) to EQ(5).

On the other hand, in the case that the current segment is ahead of the perception reaction distance zone, the current segment may be considered to be in the maneuver distance zone. Based on the road type, location, and/or traffic, etc., the storage length (aka queue length) may be added at some intersections. The storage length of any intersection can be calculated based on the traffic history data or determined from a live infrastructure camera feed. For instance, when available, the storage length may be predicted or otherwise determined for any time of day based on an infrastructure camera or other infrastructure sensor. When the current segment is within the intersection functional area but not within the perception reaction distance zone, storage length is added if available. Consequently, the $POZ_{D1}$ may be calculated based on considering the necessity of a (further) lane change, making a turn or not, determining whether there is a traffic signal intersection or sign-based intersection, and so forth.

In the example of FIG. 11, for a lane change from the left lane to the right lane, $POZ_{D1}$ is calculated as a volume having a length equal to at least $S_1+S_2+S_3$ and a width W equal to the width of the left lane and the width of the right lane, and a height of at least 3.5 feet, with a volume corresponding to zone $S_1$ being in the left lane and a volume corresponding to $S_1+S_2+S_3$ being in the right lane. In addition, the volume of $POZ_{D1}$ may also extend behind the vehicle 102 in the right lane, such as for at least a distance equivalent to $S_3$ to further ensure against a possible collision with vehicles that may be approaching in the right lane.

Figure 12:
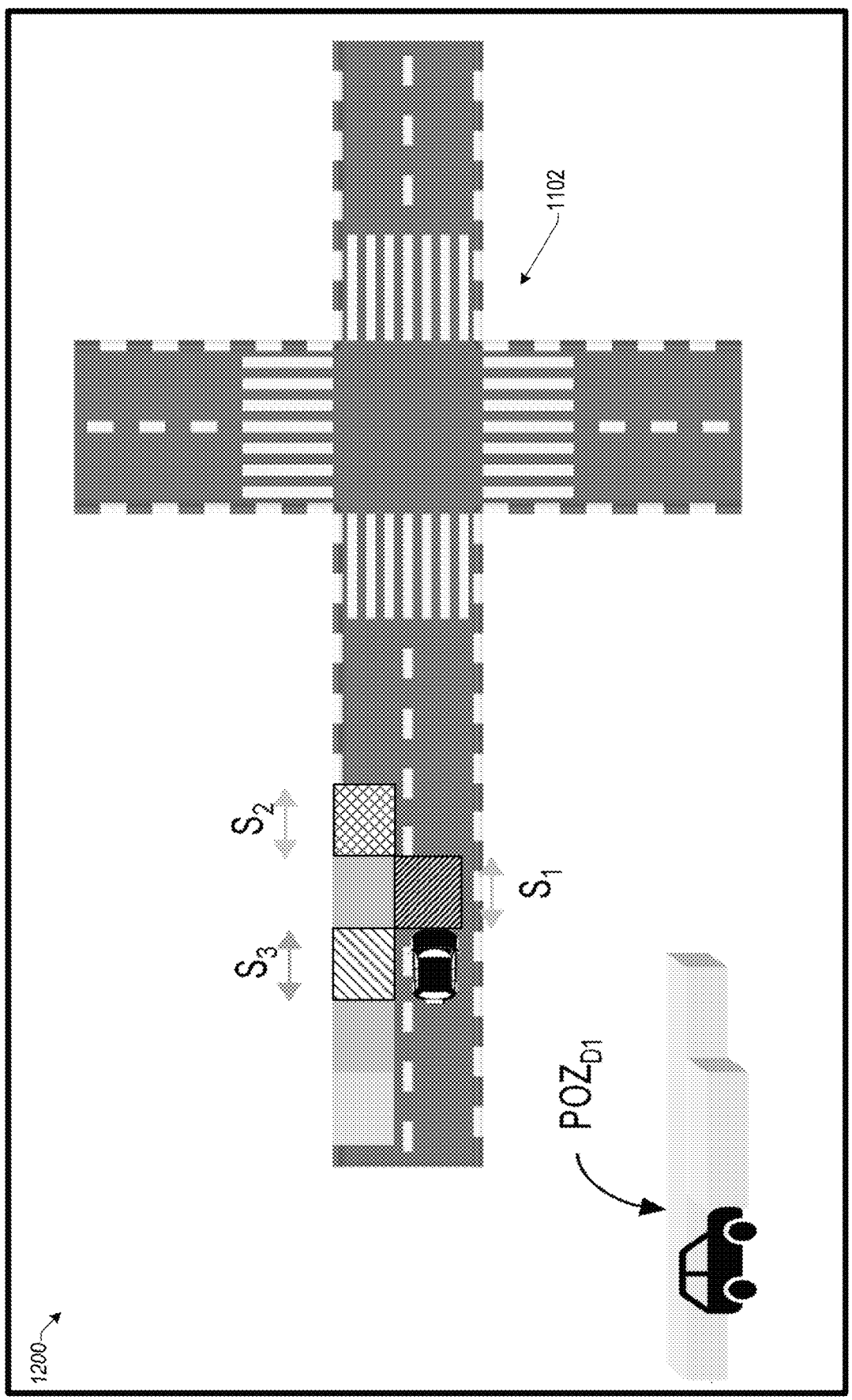
FIG. 12 illustrates an example of determining $POZ_{DI}$ in which the road segment is inside an intersection functional area according to some implementations.

FIG. 12 illustrates an example 1200 of determining $POZ_{D1}$ in which the road segment is inside an intersection functional area according to some implementations. In the example of FIG. 12, for a lane change from the right lane to the left lane, $POZ_{D1}$ is calculated as a volume having a length equal to at least $S_1+S_2+S_3$ and a width W equal to the width of the left lane and the width of the right lane, and a height of at least 3.5 feet, with a volume corresponding to zone 51 being in the right lane and a volume corresponding to $S_1+S_2+S_3$ being in the left lane. In addition, the volume of the $POZ_{D1}$ may also extend behind the vehicle 102 in the left lane, such as for a distance equivalent to at least $S_3$ to further ensure against a possible collision with vehicles that may be approaching in the left lane.

The vehicle 102 may monitor $POZ_{D1}$ to start the lane change while in the perception reaction distance zone as shown in FIGS. 11 and 12. In the case of a multilane intersection, the vehicle 102 might need to change lanes multiple times based on the next road segments of the route to the destination. Thus, single or multiple lane changes can be performed in the maneuver distance zone. In such a case, the $POZ_{M5}$ may be calculated for right or left lane changes using a procedure similar to that discussed with respect to FIGS. 11 and 12.

Figure 13:
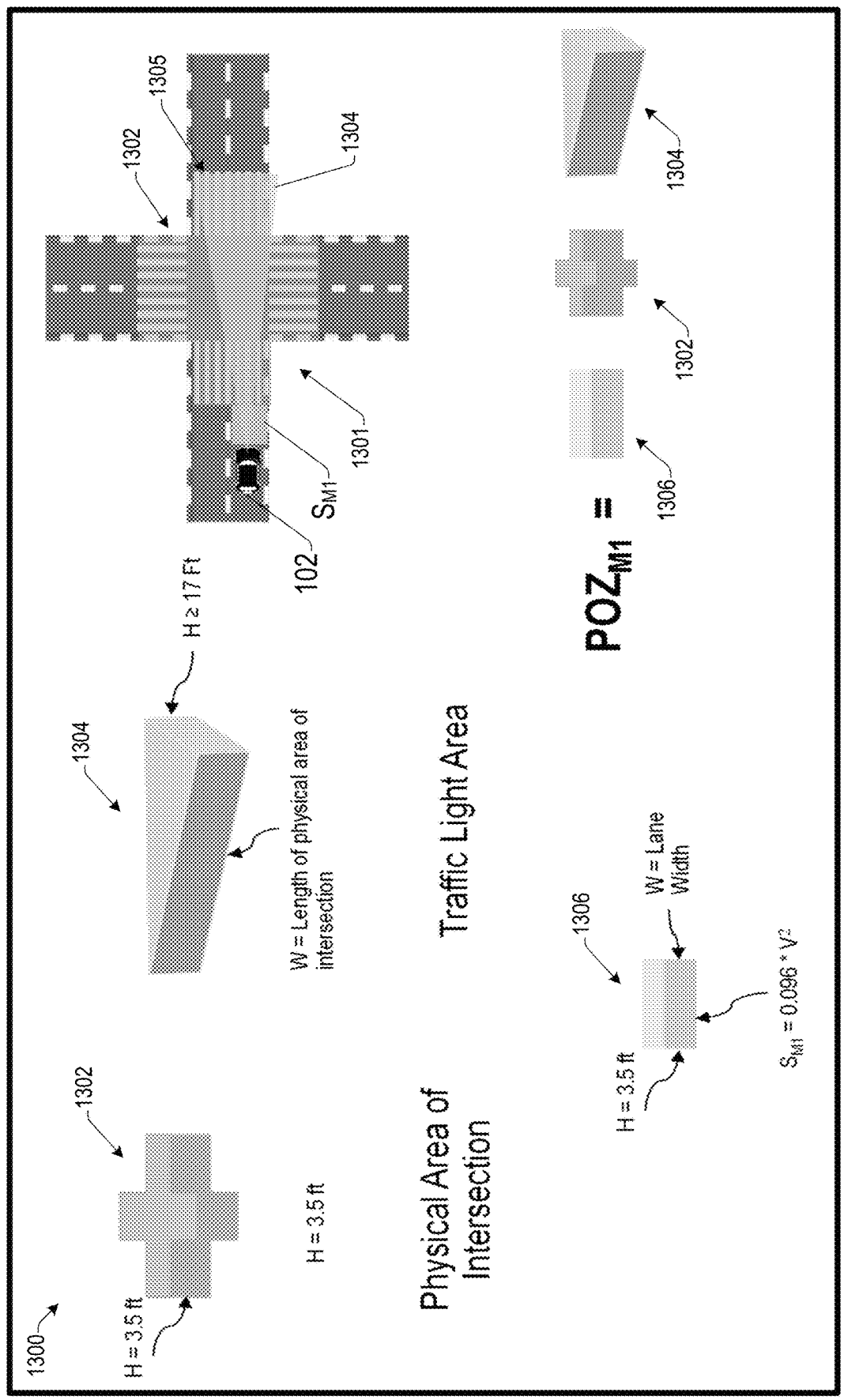
FIG. 13 illustrates an example of determining $POZ_{M1}$ in which the road segment is inside an intersection functional area according to some implementations.

FIG. 13 illustrates an example 1300 of determining $POZ_{M1}$ in which the road segment is inside an intersection functional area according to some implementations. In this example, suppose that the vehicle 102 is within a road segment that is within the intersection functional area and not within the perception reaction distance zone. Further, suppose that no lane change or turn is required for continuing along the route to the destination. In such a case, the system may determine the type of intersection 1301 that the vehicle 102 is approaching, e.g., a traffic-light-based intersection or signed-based intersection. For example, if traffic crosses the intersection based on the traffic light signals, $POZ_{M1}$ may be calculated by determining a first observation zone volume 1302 that corresponds in shape to the physical area of the intersection 1301. The first observation zone volume 1302 may have a height H that is greater than or equal to 3.5 feet. In addition, the $POZ_{M1}$ may also include a second observation volume 1304 corresponding to the traffic light area. The second observation zone volume 1304 may have a width on its wider end based on the width of the physical area of the intersection at 1305 (i.e., the width of the road in this example. In addition, the height H of the second observation zone volume may be greater than or equal to 17 feet. Additionally, the $POZ_{M1}$ may include a third observation zone volume 1306 that may correspond to the stopping sight distance $S_{M1}$. The third observation zone volume 1306 may have a width equal to the current lane width, a height greater than or equal to 3.5 feet, and a length equal to the stopping sight distance $S_{M1}$, which may be calculated based on EQ(3) discussed above. Accordingly, $POZ_{M1}$ may be determined by combining the volumes of 1302+1304+1306 to generate the observation zone volume $POZ_{M1}$.

Figure 14:
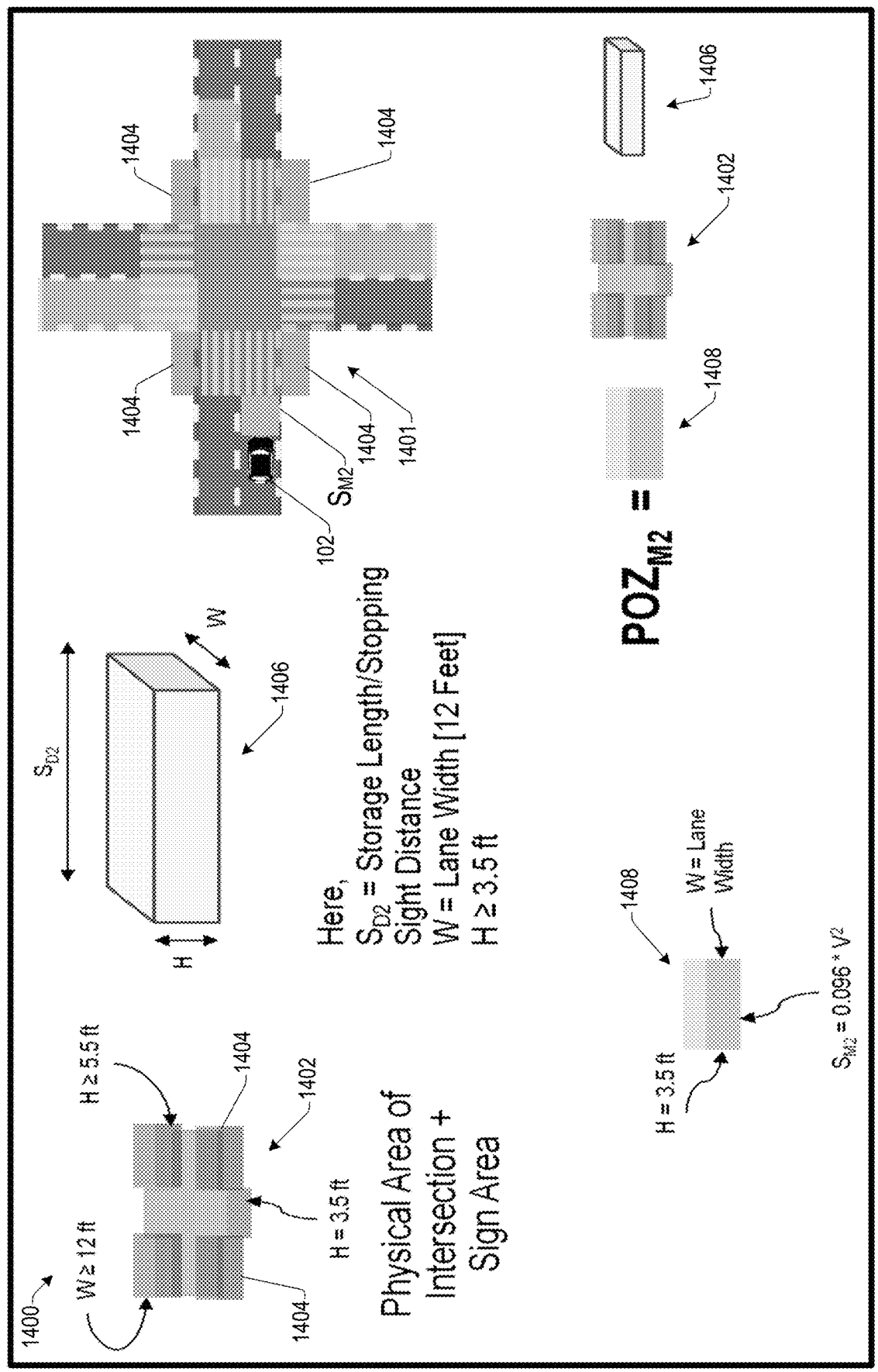
FIG. 14 illustrates an example of determining $POZ_{M2}$ in which the road segment is inside an intersection functional area according to some implementations.

FIG. 14 illustrates an example 1400 of determining $POZ_{M2}$ in which the road segment is inside an intersection functional area according to some implementations. For instance, in the example of FIG. 13, the intersection 1301 has a traffic signal. On the other hand, in the example of FIG. 14, suppose that the intersection 1401 includes traffic signs (e.g., two-way or four-way stop signs) and that the vehicle 102 is within a road segment that is within the intersection functional area and not within the perception reaction distance zone. Further, suppose that no lane change or turn is required for continuing along the route to the destination. In such a case, the system may determine that the type of intersection 1401 that the vehicle 102 is approaching is a signed-based intersection.

In this example, the $POZ_{M2}$ may be calculated by determining a first observation zone volume 1402 that corresponds in shape to the physical area of the intersection 1401 plus a sign area (i.e., rectangles 1404 located at four corners of the intersection 1401 in this example). The first observation zone volume 1302 may have a height that is greater than or equal to 3.5 feet for the physical area of the intersection and greater than or equal to 5.5 feet for the sign areas 1404. In addition, the $POZ_{M2}$ may also include a second observation volume 1406 corresponding to the stopping sight distance $S_{D2}$, which corresponds to the upstream stopping distance plus any storage queue length. For instance, $S_{D2}$ can be considered as the storage length, or otherwise $S_{D2}$ can be calculated as shown in EQ(7). The second observation zone volume 1406 may have a width corresponding to the lane width (e.g., 12 feet) and height greater than or equal to 3.5 feet. In addition, the $POZ_{M2}$ may include a third observation zone volume 1408 that may correspond to the stopping sight distance $S_{M2}$. The third observation zone volume 1306 may have a width equal to the current lane width (e.g., 12 feet), a height greater than or equal to 3.5 feet, and a length equal to the stopping sight distance $S_{M2}$, which may be calculated based on EQ(3) discussed above. Accordingly, $POZ_{M2}$ may be determined by combining the volumes of 1402+1406+ 1408 to generate the observation zone volume $POZ_{M2}$.

$POZ_{M3}$ and $POZ_{M4}$ may be determined when the vehicle 102 will make a turn at the intersection. If there is a traffic light at the intersection, the calculation for determining $POZ_{M3}$ may be performed, as discussed with respect to FIGS. 15 and 16. Otherwise, when there is a sign at the intersection, the calculation for determining $POZ_{M4}$ may be performed, as discussed with respect to FIGS. 17 and 18. In both cases, turn sight distance may be determined for determining $POZ_{M3}$ and $POZ_{M4}$. In the case of a right turn, a right turn sight distance may be calculated. Similarly, in the case of a left turn, a left turn sight distance may be calculated. The turn sight distance determination may depend on several factors including intersection type, number of lanes, vehicle type, speed limit, skew angle, and median width. In some examples, a look up table may be prepared in advance to determine the right turn sight distance and the left turn sight distance for calculating the respective POZs.

Figure 15:
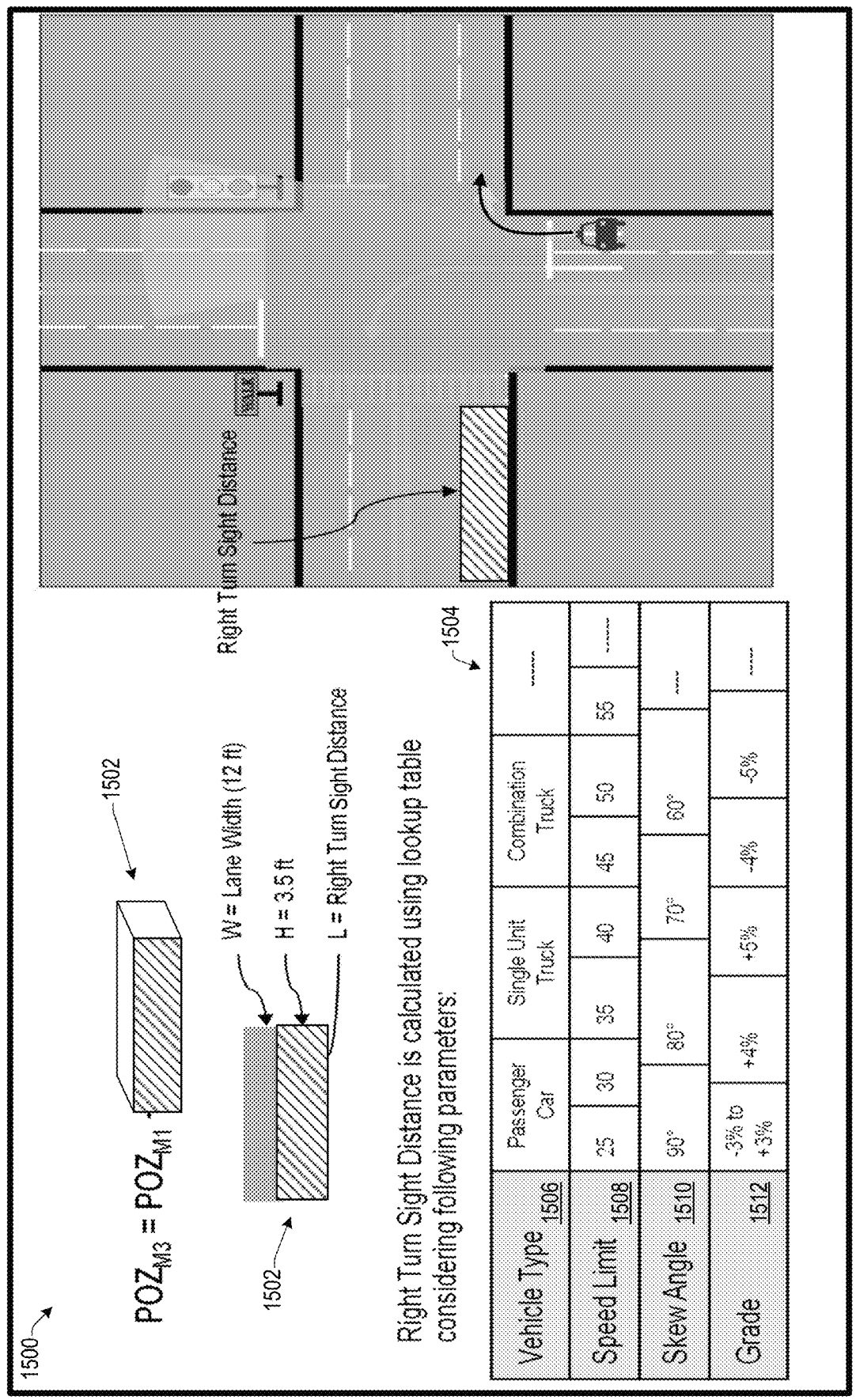
FIG. 15 illustrates an example of determining $POZ_{M3}$ for a right turn and when there is a traffic signal according to some implementations.

FIG. 15 illustrates an example 1500 of determining $POZ_{M3}$ for a right turn and when there is a traffic signal according to some implementations. In this example, the observation zone volume $POZ_{M3}$ (i.e., when there is a traffic light and a right turn will be made) may be determined by adding a right turn sight distance observation zone volume 1502 to the observation zone volume $POZ_{M1}$. The example of FIG. 15 further includes a lookup table 1504 that includes values for vehicle type 1506, speed limit 1508, skew angle 1510, and road grade 1512. The values from the lookup table 1504 may be used to determine the right turn sight distance L, which is the length of the observation volume 1502 corresponding to the right turn sight distance. In this example, the right turn sight distance observation volume 1502 has a width equal to the lane width (e.g., 12 feet) and a height greater than or equal to 3.5 feet.

Figure 16:
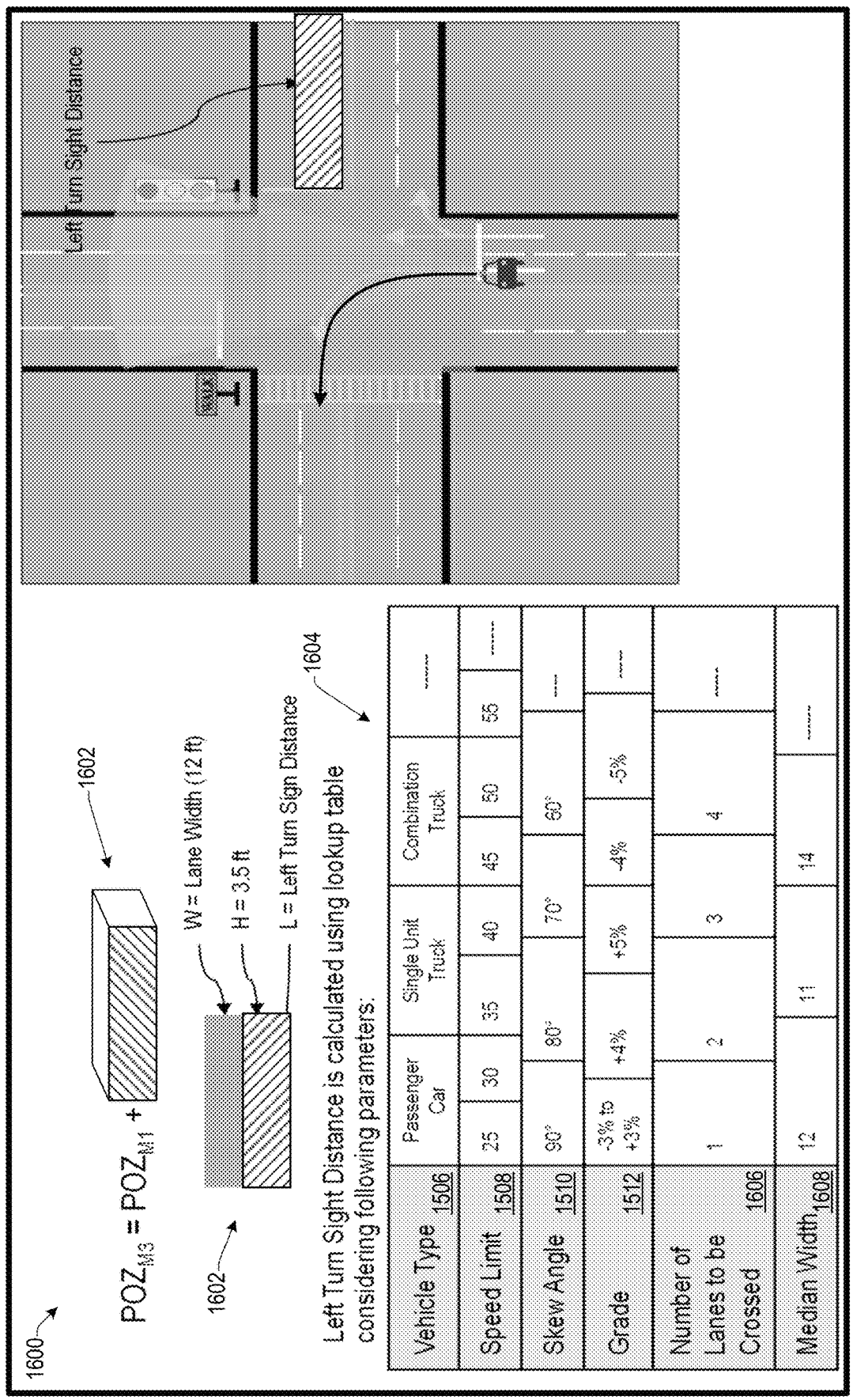
FIG. 16 illustrates an example of determining $POZ_{M3}$ for a left turn and when there is a traffic signal according to some implementations.

FIG. 16 illustrates an example 1600 of determining POZ$_{M3}$ for a left turn and when there is a traffic signal according to some implementations. In this example, the observation zone volume POZ$_{M3}$ is determined by adding a left turn sight distance observation volume 1602 to the observation zone volume POZ$_{M1}$. The example of FIG. 16 further includes a lookup table 1604 that includes values for vehicle type 1506, speed limit 1508, skew angle 1510, and road grade 1512, as in FIG. 15, and includes additional values for number of lanes to be crossed 1606 and median width 1608. The values from the lookup table 1604 may be used to determine the left turn sight distance L, which is the length of the observation volume 1602 corresponding to the left turn sight distance. In this example, the left turn sight distance observation volume 1602 has a width equal to the lane width (e.g., 12 feet) and a height greater than or equal to 3.5 feet.

Figure 17:
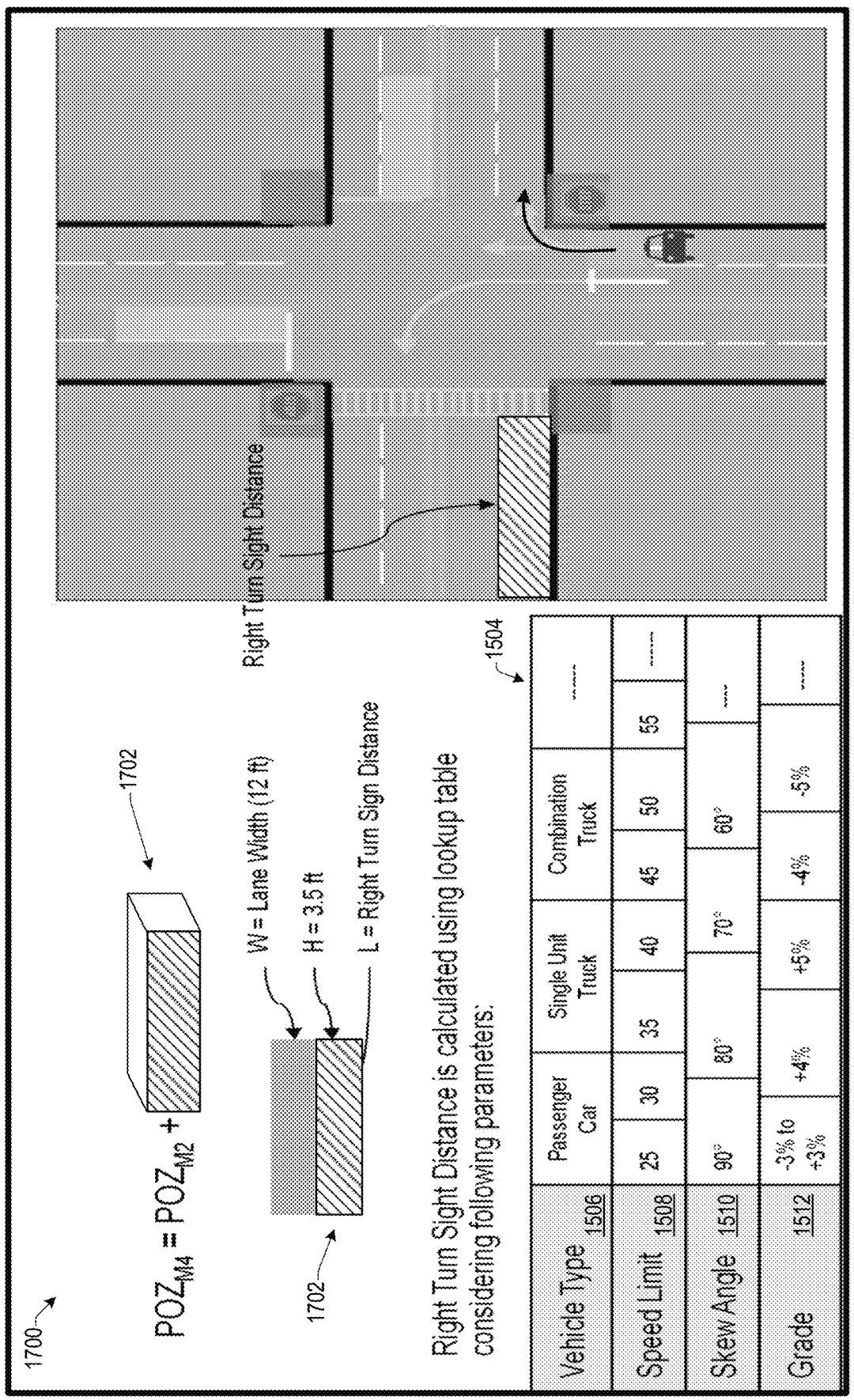
FIG. 17 illustrates an example of determining $POZ_{M4}$ for a right turn and when the intersection has signs according to some implementations.

FIG. 17 illustrates an example 1700 of determining POZ$_{M4}$ for a right turn and when the intersection has signs according to some implementations. In this example, the observation zone volume POZ$_{M4}$ (i.e., when there is not a traffic light and a right turn will be made) is determined by adding a right turn sight distance volume 1702 to the observation zone volume POZ$_{M1}$. The example of FIG. 17 further includes the lookup table 1504 that includes values for vehicle type 1506, speed limit 1508, skew angle 1510, and road grade 1512. The values from the lookup table 1504 may be used to determine the right turn sight distance L, which is the length of the observation volume 1702 corresponding to the right turn sight distance. In this example, the right turn sight distance observation volume 1702 has a width equal to the lane width (e.g., 12 feet) and height greater than or equal to 3.5 feet.

Figure 18:
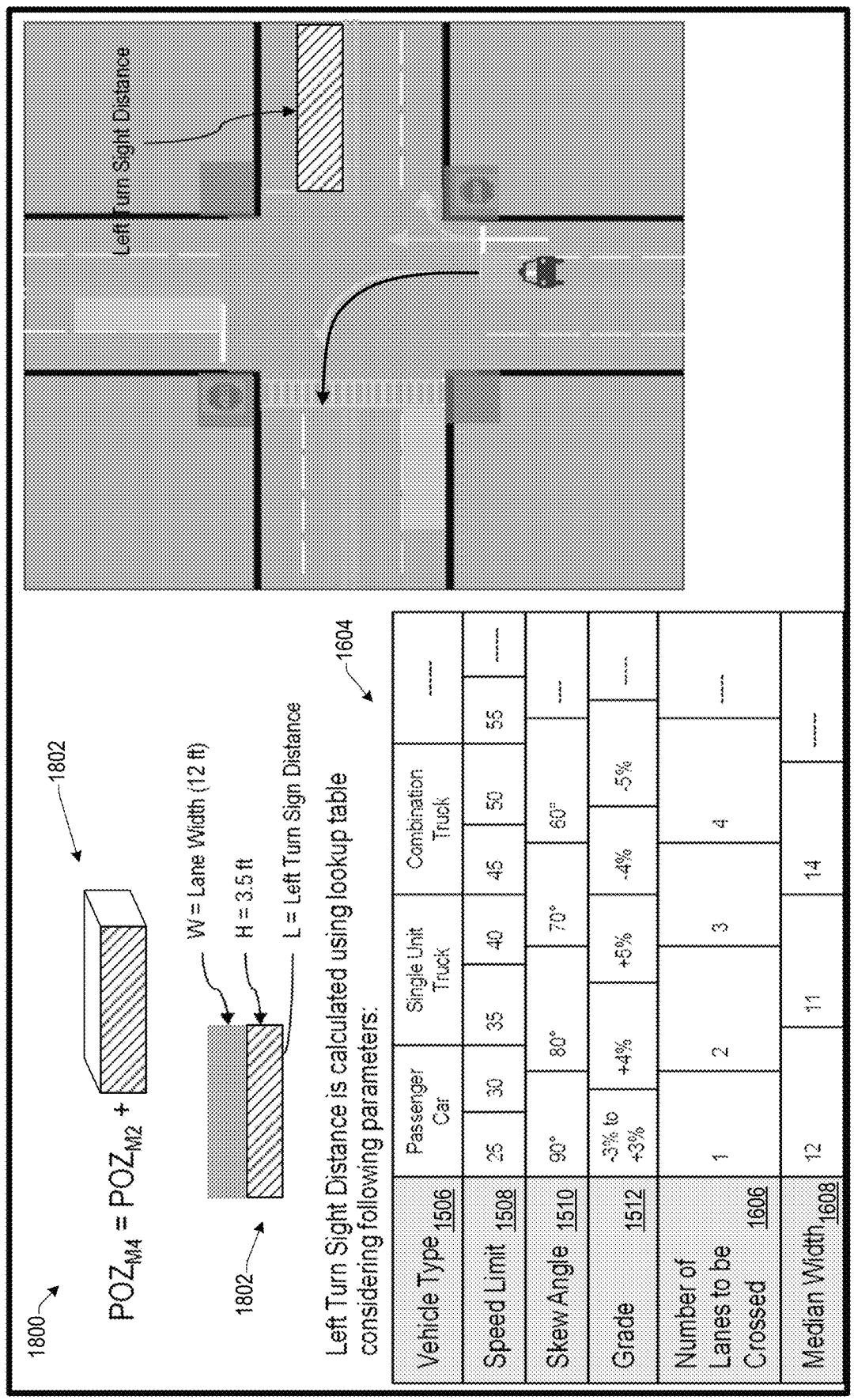
FIG. 18 illustrates an example of determining $POZ_{M4}$ for a left turn and when the intersection has signs according to some implementations.

FIG. 18 illustrates an example 1800 of determining POZ$_{M4}$ for a left turn and when the intersection has signs according to some implementations. In this example, the observation zone volume POZ$_{M3}$ is determined by adding a left turn sight distance volume 1802 to the observation zone volume POZ$_{M1}$. The example of FIG. 18 further includes the lookup table 1604 that includes values for vehicle type 1506, speed limit 1508, skew angle 1510, and road grade 1512, as in FIG. 15, and includes additional values for number of lanes to be crossed and median width. The values from the lookup table 1604 may be used to determine the left turn sight distance L, which is the length of the observation volume 1802 corresponding to the left turn sight distance. In this example, the left turn sight distance observation volume 1802 has a width equal to the lane width (e.g., 12 feet) and height greater than or equal to 3.5 feet.

Figure 19:
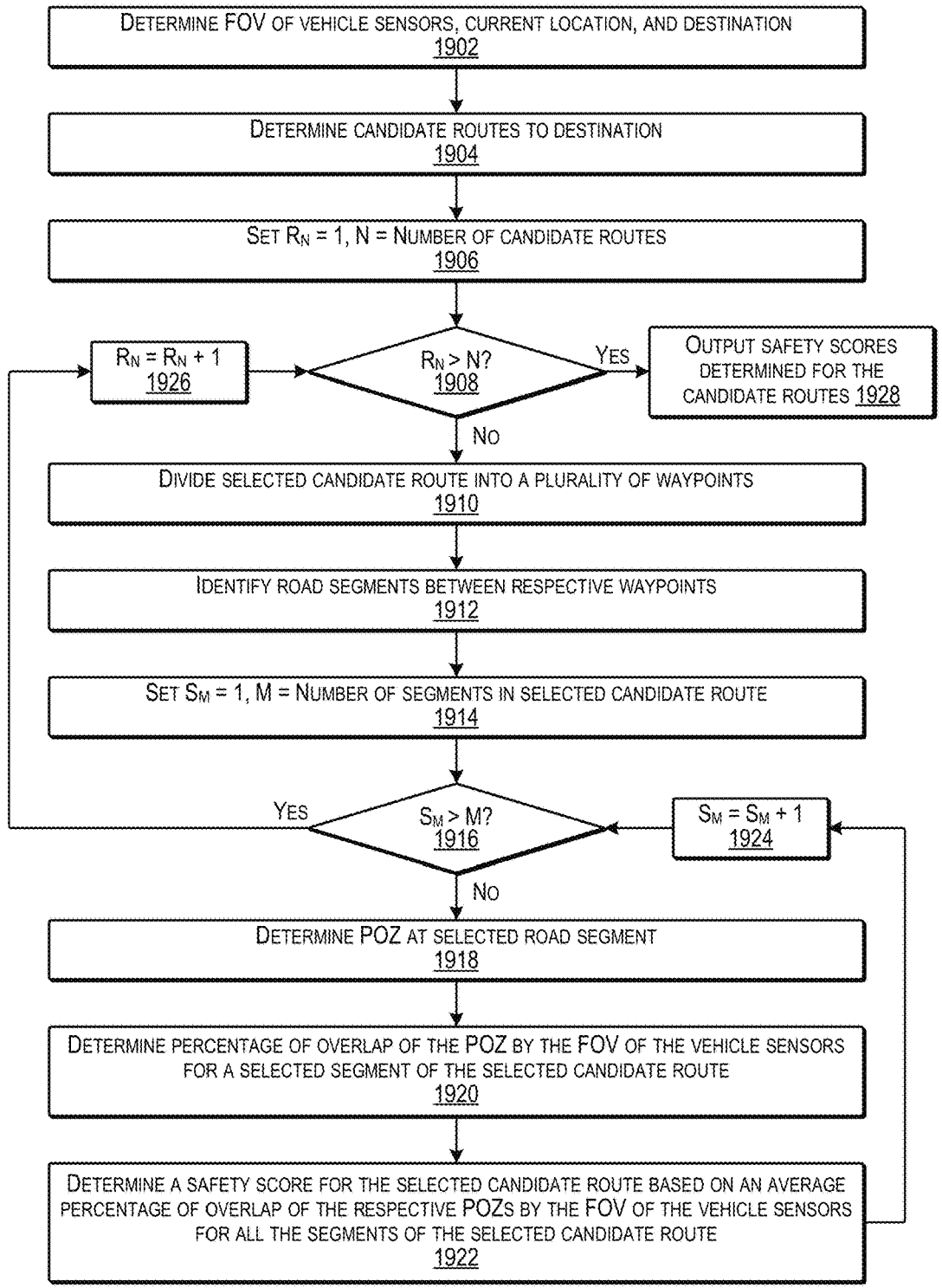
FIG. 19 is a flow diagram illustrating an example process 1900 for determining safety scores for candidate routes according to some implementations.

FIG. 19 is a flow diagram illustrating an example process 1900 for determining safety scores for candidate routes according to some implementations. In some examples, the process 1900 may be executed by the system 100 discussed above. For example, the process 1900 may be executed by the service computing device(s) 108 by executing the navigation information program 146 in some examples.

As explained above, e.g., with respect to FIG. 5, the POZ determining process executed by the predictive analytics module(s) 150 may determine the POZ for all road segments of each candidate route. The POZ determinations may be performed sequentially or in parallel. In addition, the POZs determined for the respective road segments may be stored in the databases 154 for future use, such as in the map data database 156, or the like. Accordingly, when the POZ of a road segment under consideration is available in the map data database 156, the system may utilize the stored POZ rather than having to recalculate the POZ. The POZs determined for respective road segments may be sent to the safety score determining process of the predictive analytics module(s) 150. In the safety score determining process, the 3D POZ of the road segments for every candidate route may be compared with the vehicle sensor field of view (FOV) for the vehicle for which the route is being determined. For each road segment, the percentage of 3D POZ overlapped by the vehicle sensor FOV may be determined. When the POZs for all the road segments for a particular candidate route have been determined, an average percentage may be calculated for the candidate route by averaging the percentage of overlap of the POZs by the FOV for all road segments for that candidate route. The average percentage may be used as the safety score of the candidate route in some implementations herein. The candidate route that provides the highest percentage may indicate the safest route for the particular vehicle, such as based on maximizing the amount of automated driving time. The following is an example process; however, numerous variations will be apparent to those of skill in the art having the benefit of the disclosure herein.

At 1902, the service computing device may determine the field of view of the vehicle sensors, current vehicle location, and the destination.

At 1904, the service computing device may determine candidate routes to the destination.

At 1906, the service computing device may set a counter R$_N$ equal to one where N is the number of candidate routes.

At 1908, the service computing device may determine whether R$_N$ is greater than N. If so, the process goes to 1928. If not, the process goes to 1910.

At 1910, the service computing device may divide the selected candidate route into a plurality of waypoints. An example is discussed above with respect to FIG. 6.

At 1912, the service computing device may identify road segments between the respective waypoints.

At 1914, the service computing device may set a segment counter S$_M$ equal to one where M is the number of segments in a selected candidate route.

At 1916, the service computing device may determine whether S$_M$ is greater than M. If so, the process goes to 1926. If not, the process goes to 1918.

At 1918, the service computing device may determine the POZ at the selected road segment. Examples are discussed above with respect to FIGS. 8-18.

At 1920, the service computing device may determine the percentage of overlap of the POZ by the FOV of the vehicle sensors for the selected segment of the selected candidate route.

At 1922, the service computing device may determine a safety score for the selected candidate route based on an average percentage of overlap of the respective POZs by the FOV of the vehicle sensors for all the segments of the selected candidate route.

At 1924, the service computing device may increment the counter S$_M$ by one and return to block 1916 to determine whether the current value of S$_M$ is greater than M.

At 1926, when the current value of S$_M$ is greater than M, the service computing device may increment the counter R$_N$ by one and return to block 1908 to determine whether R$_N$ is greater than N.

At 1928, when R$_N$ is greater than N, the service computing device may output the safety scores determined for the candidate routes.

Figure 20:
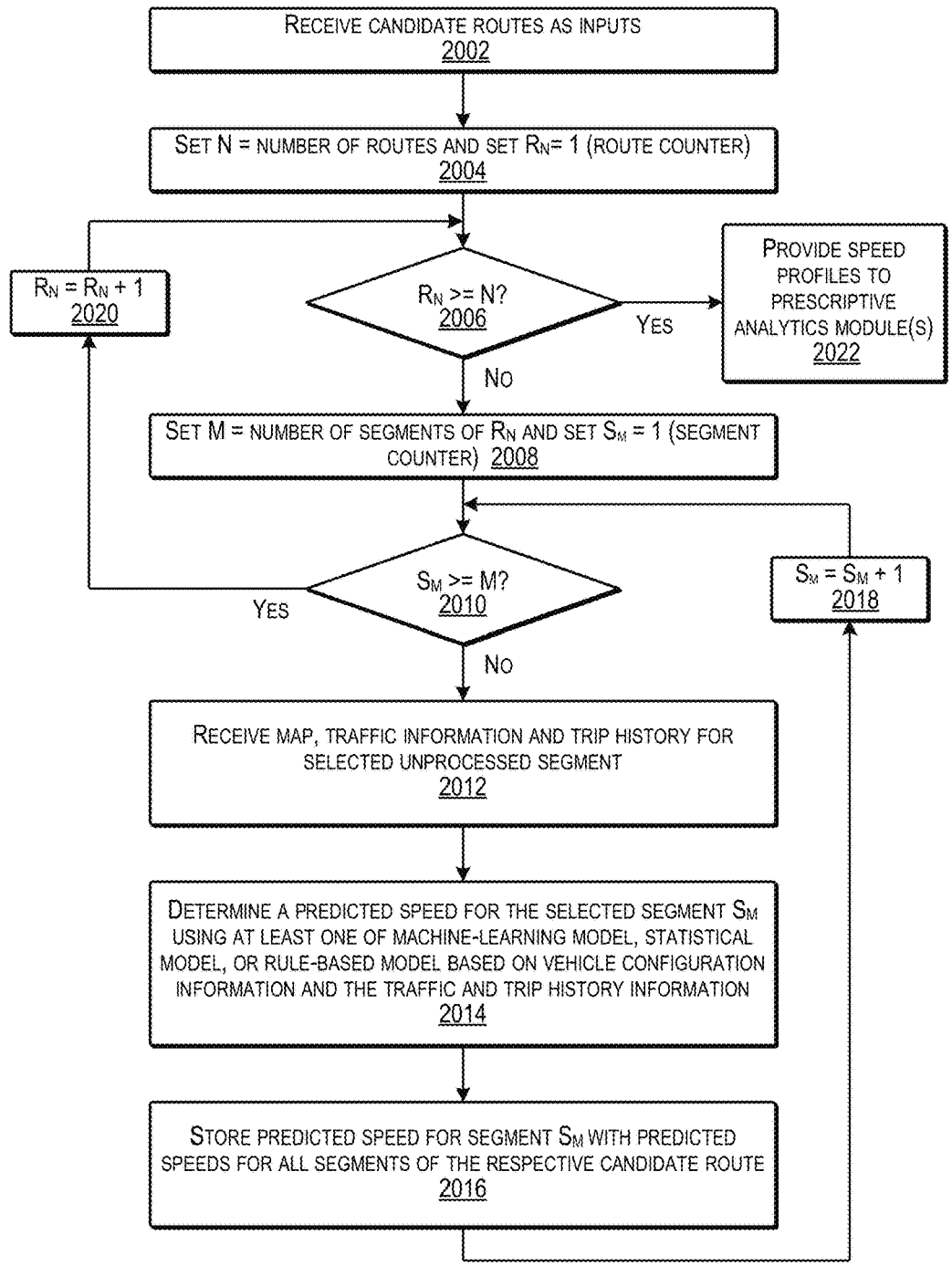
FIG. 20 is a flow diagram illustrating an example speed profile algorithm as a process for determining predicted speed along a candidate route according to some implementations.

FIG. 20 is a flow diagram illustrating an example speed profile algorithm 2000 as a process for determining predicted speed along a candidate route according to some implementations. In some examples, the process 2000 may be executed by the system 100 discussed above. For example, the process 2000 may be executed by the service computing device 108 executing the predictive analytics module(s) 150.

In some cases, the process 2000 may correspond in part to block 528 of FIG. 5 discussed above. For example, as mentioned above, the speed profile determining process of the predictive analytics module(s) 150 predicts the vehicle speed for the candidate routes to the destination. The speed profile determining process may receive the most updated candidate routes from the routing and monitoring process in the predictive or descriptive analytics layers. For every road segment of each candidate route, the vehicle speed may be predicted using a combination of AI and statistical models as a speed prediction model. The inputs to the speed prediction model may include real-time traffic, trip history of the current road segment, etc. The real-time traffic speed may be obtained from a third party data provider. The speed profile for the candidate route is determined by storing the predicted speed for every road segment in the respective candidate route. The speed profile determination process may be executed for all candidate routes.

At 2002, the service computing device may receive candidate routes as inputs. For example, as discussed above, the speed profile algorithm may receive a plurality of candidate routes from the routing and monitoring algorithm executed in either the descriptive analytics layer or the predictive analytics layer.

At 2004, the service computing device may initialize a first loop by setting a first variable N=number of routes, e.g., representative of the total number candidate routes, and setting a second variable $R_N=1$, e.g., as a counter representative of the candidate route currently selected for processing.

At 2006, the service computing device may determine whether the value of $R_N$ is greater than or equal to the value of N. If not, the process goes to block 2008. If so, the process goes to block 2022.

At 2008, the service computing device may initialize a nested second loop by setting a third variable M=number of segments of $R_N$, and setting a fourth variable $S_M=1$, e.g., as a counter representative of the segment currently selected for processing.

At 2010, the service computing device may determine whether $S_M$ is greater than or equal to M. If not, the process goes to block 2012. If so, the process goes to block 2020 to increment $R_N$.

At 2012, the service computing device may receive map, traffic information, and trip history for the selected segment of the selected candidate route.

At 2014, the service computing device may determine a predicted speed for the selected segment $S_M$ using a speed prediction model that includes at least one of a machine-learning model, a statistical model, or a rule-based model based on vehicle configuration information and the traffic and trip history information for the selected road segment. The output of the speed prediction model may be a predicted speed profile for the selected segment of the selected candidate route.

At 2016, the service computing device may store the predicted speed for the selected segment $S_M$ with the predicted speeds for all segments of the respective candidate route.

At 2018, the service computing device may increment the variable $S_M$ by a value of one, and may return to block 2010.

For example, the process of blocks 2010-2018 may be repeated until all segments in a selected candidate route have been processed.

At 2020, when $S_M=M$, all of the segments in the candidate route have been processed, and the service computing device may increment the variable $R_N$ by a value of one. The process may then return to block 2006 to determine whether all candidate routes have been processed, i.e., $R_N=N$.

At 2022, when all candidate routes have been processed, the output of the speed profile algorithm may be passed to at least the predictive analytics module(s) 152.

Figure 21:
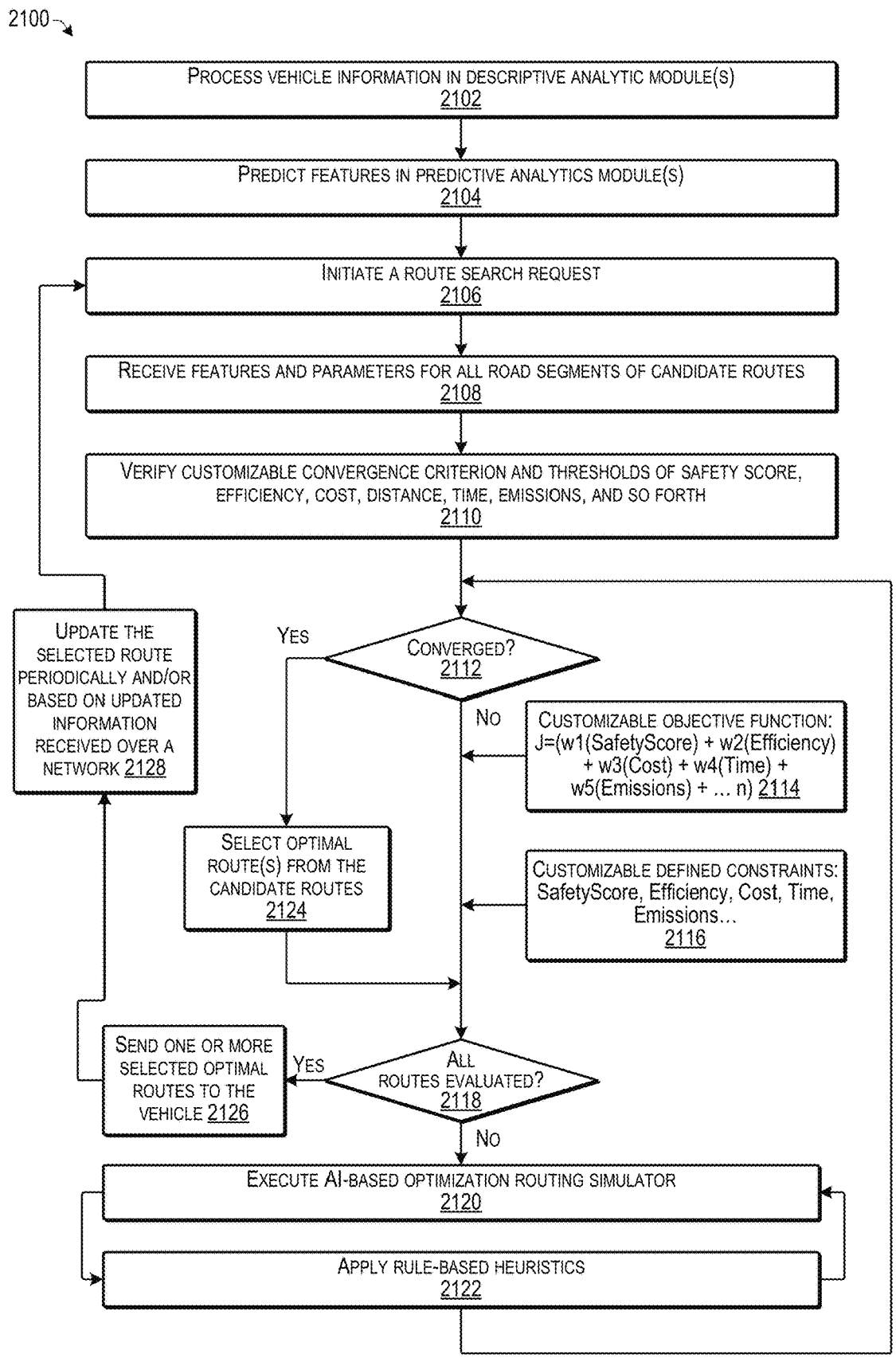
FIG. 21 is a flow diagram illustrating an example process for determining an optimal route for a vehicle according to some implementations.

FIG. 21 is a flow diagram illustrating an example process 2100 for determining an optimal route for a vehicle according to some implementations. In some examples, the process 2100 may be executed by the system 100 discussed above. For example, the process 2100 may be executed by the service computing device(s) 108 by executing the navigation information program 146 in some examples.

As discussed above with respect to FIG. 5, the prescriptive analytics module(s) 152 may perform the process 2100 in some examples. For instance, the respective predicted speed profiles of the candidate routes may be sent to the second hierarchical level of the predictive analytics module(s) 150 for calculation of the desired parameters, namely, efficiency, cost, distance, time, and emissions, and the like, for the candidate routes. The efficiency determination process may include prediction of the powertrain load of the corresponding vehicle for every road segment of the candidate routes. To predict the powertrain load, the determining process may consider real time weather, road profile data, traffic, and the like, obtained through the database(s) 154 and/or third party real-time data service providers, as discussed above. For example, the predicted powertrain load and speed profile may be provided as inputs to a powertrain model that may be configured using a data driven or physics-based model (or a combination of these models) to predict the vehicle efficiency for each respective road segment. In some examples, the efficiency determining process may employ different powertrain models configured specifically for various different commercially available vehicles. The cumulative predicted efficiency of all road segments for each candidate route indicates the efficiency of that vehicle for the respective candidate route. In some examples, the predicted efficiency may be converted into miles per gallon (MPG) or other efficiency indicator for each of the candidate routes.

In addition, the cost of each candidate route may be determined by the cost determination process based at least in part on a current fuel price and the MPG calculated by the efficiency process. Furthermore, the distance associated with each of the candidate routes may be determined by summing the length of all the respective road segments of each of the candidate routes. The time determination process may determine the estimated time that will be consumed for the vehicle to traverse each of the candidate routes based on the predicted speed and distance. In some examples, the time determination process may also take into consideration signal phases and timing information for each of the intersections for each of the candidate routes. The predicted powertrain load and speed profiles may also be used as inputs to an emissions model configured for determining the emissions predicted to be produced by the vehicle for respective road segments. For example, the emissions for any route may be determined by totaling the amount of emissions of all road segments for each candidate route.

In addition to the above-discussed parameters, the predictive analytics module(s) 150 may determine other parameters that may be of interest for determining the optimal route for a vehicle. One of such parameter may include vehicle dynamics, which may be a parameter that indicates predicted vehicle dynamics performance of fully or partially autonomous vehicles such as for determining vehicle jerk, roll, pitch, yaw, turning performance, and the like, using inputs of speed limit and road geometry for each candidate route. A physics-based vehicle model or AI based algorithm may be used for the vehicle dynamics determination process, such as based on simulating vehicle performance for each road segment of each of the candidate routes.

The parameters determined by the predictive analytics module(s) 150 may be fed to a route optimization process performed by the prescriptive analytics module(s) 152 to select the best or otherwise optimal route from the list of candidate routes. FIG. 21 provides a flow diagram of an example process 2100. In this example, the optimal route process may be performed by leveraging both AI-based optimization and rule-based heuristics. For instance, the AI-based optimization may achieve a global and/or local optimum for routing based on a large optimization parameter space, while rule-based heuristics may be applied to ensure feasible results. As shown in FIG. 21, the connected vehicle information may be processed in the descriptive analytics module(s) 148 prior to the feature and parameter estimations being determined by the predictive analytics module(s) 150. The optimal route selection process may initiate with a route search request utilizing the features, parameters, and routing information obtained from descriptive analytics module(s) 148 and predictive analytics module(s) 150. The process 2100 includes an optimization iteration loop that may be initiated to verify whether a user-defined customizable convergence criteria is met or not; otherwise optimization is executed for all candidate routes. Consecutively, the AI-based optimization may receive a customizable (e.g., user defined) objective function and constraints as input, along with the road segment and candidate route information, and the corresponding parameters. The AI based optimization solvers may internally call a routing simulator to evaluate the defined objective function and constraints on the input data. The output of the AI-based optimization is passed for verification to rule-based heuristics. The output of the heuristics functions may be fed back to the AI-based optimization to enable feasible and fast convergence. Once the optimization is converged, the optimal route identified by the process may be selected and sent to the vehicle. The output of the optimization process may be updated at a specified time interval and/or the update may be performed in response to a trigger-based event, such as a change in weather, change in live traffic information, or the like, which may trigger the process to update and determine whether an alternative route may now be the optimal route.

At 2102, the service computing device may process vehicle information in the descriptive analytics module(s) 148, e.g., as discussed above with respect to FIG. 5.

At 2104, the service computing device may predict features in the predictive analytics module(s) 150, e.g., as discussed above with respect to FIG. 5.

At 2106, the service computing device may initiate a route search request.

At 2108, the service computing device may receive features and parameters for all road segments of the candidate routes.

At 2110, the service computing device may verify customizable convergence criterion, which may include thresholds of safety score, efficiency, cost, distance, time, emissions, and so forth.

At 2112, the service computing device may determine whether the AI-based optimal route selection process has converged. If so, the process goes to 2124. If not, the process goes to 2118.

At 2114, the service computing device may apply a customizable objective function, which in this example, may apply respective weights to each parameter of interest such as safety score, efficiency, cost, time, emissions, and so forth.

At 2116, the service computing device may define the customizable constraints for the customizable objective function.

At 2118, the service computing device may determine whether all candidate routes have been evaluated. If so, the process goes to 2126. If not, the process goes to 2120.

At 2120, the service computing device may execute the AI-based optimization routing simulator to determine an optimal route based on the parameters and route information.

At 2122, the service computing device may apply rule-based heuristics as feedback to the AI-based routing simulator to ensure that a selected route meets threshold requirements. In some cases, the AI-based optimization and the rule-based heuristics may be performed as a looped process until the output meets one or more thresholds.

At 2124, the service computing device may select an optimal route from the candidate routes and the process may return to 2118 to determine whether all candidate routes have been evaluated.

At 2126, when all candidate routes have been evaluated, the service computing device may send one or more selected optimal routes to the vehicle.

At 2128, the service computing device may update the selected optimal route periodically and/or based on updated information received over the network.

Figure 22:
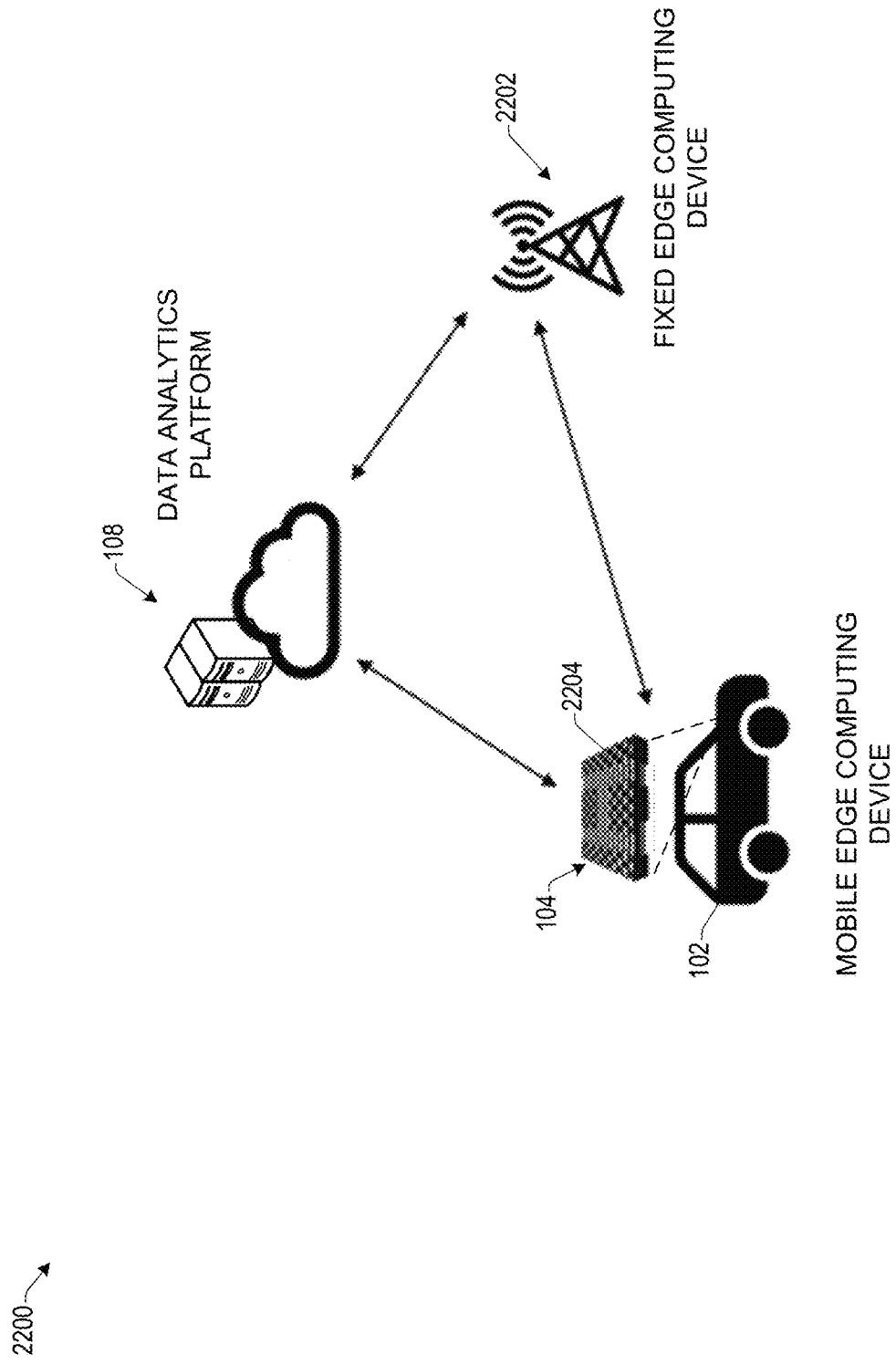
FIG. 22 illustrates an example system configuration according to some implementations.

FIG. 22 illustrates an example system configuration 2200 according to some implementations. In this example, at least a portion of the processing may be performed on at least one of the vehicle 102 (as a mobile edge computing device) or a fixed edge computing device 2202 of a roadside unit. For instance, vehicle computing device(s) 104 may include an AD/ADAS ECU 2204 that may have sufficient processing capacity to determine the POZs, safety scores, and optimal routes onboard the vehicle 102. Additionally, or alternatively, the fixed edge computing device 2202 of a roadside unit may determine the POZs, safety scores, and the optimal routes. Further, in some cases, the determination of the POZs, safety scores, and optimal routes may be performed using a combination of the vehicle computing device(s) 104, the fixed edge computing device 2202 (Roadside unit—RSU), and data analytics platform executed on the service computing devices 108, with any desired division of processing resources.

Figure 23:
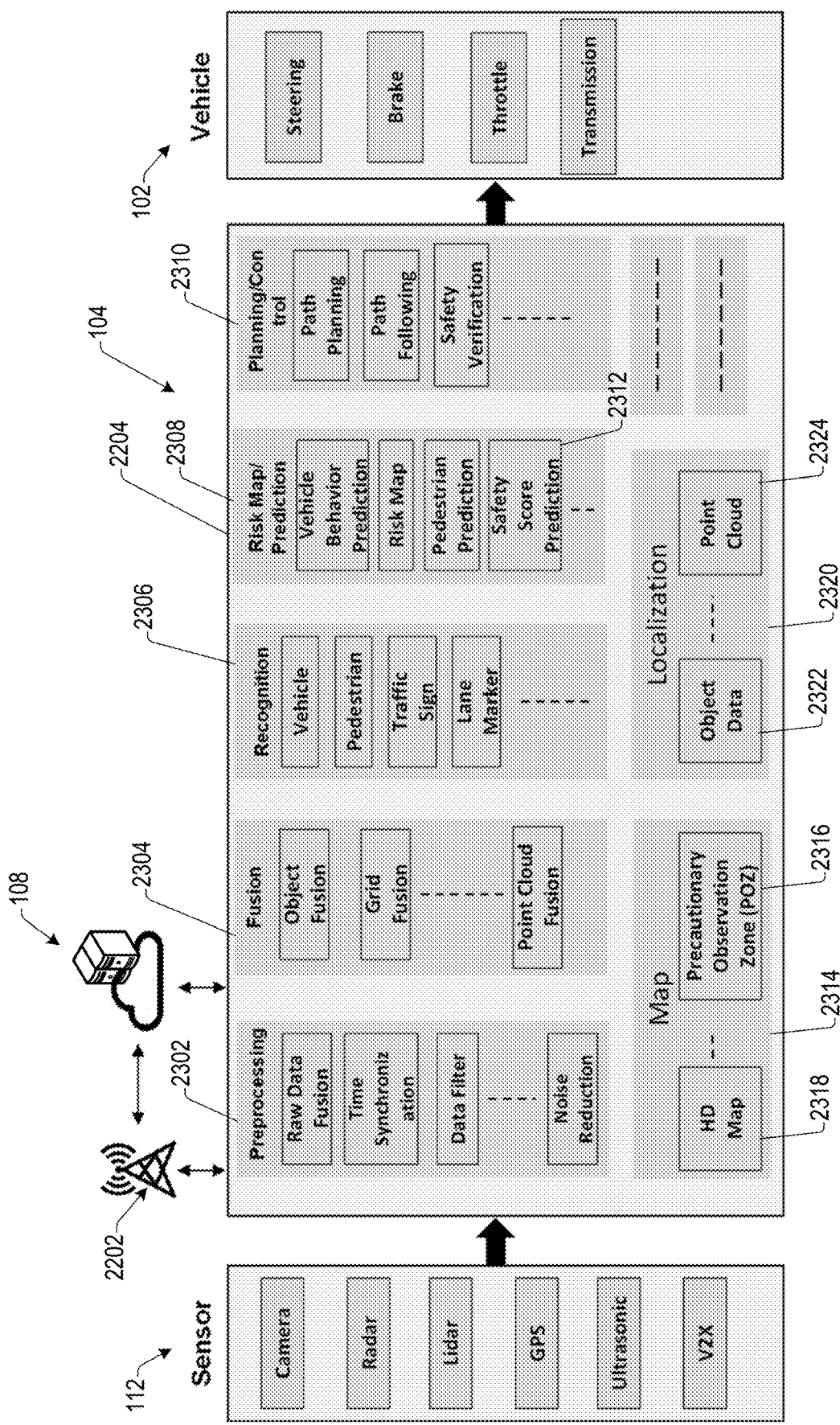
FIG. 23 illustrates an example schematic diagram of an autonomous driving control architecture according to some implementations.

FIG. 23 illustrates an example schematic diagram of an autonomous driving control architecture 2300 according to some implementations. In this example, the vehicle computing device(s) 104 discussed above with respect to FIG. 1 may include the AD/ADAS ECU 2204 that may perform a plurality of different functions, such as data preprocessing 2302, fusion 2304, recognition 2306, risk map/prediction 2308, planning/control 2310, and so forth. For example, the data preprocessing 2302 may include raw data fusion, time synchronization, data filtering, noise reduction and so forth. The fusion 2304 may include object fusion, grid fusion, point cloud fusion, and the like. The recognition 2306 may include vehicle recognition, pedestrian recognition, traffic sign recognition, lane marker recognition, and so forth. The risk map/prediction 2308 may include vehicle behavior prediction, risk map generation, pedestrian prediction, and safety score prediction 2312. Furthermore, the planning/control 2310 may include path planning, path following, and safety verification.

In this example, the precautionary observation zones (POZs) may be calculated in the risk map/prediction 2308 as part of the safety score prediction 2312. The vehicle computing device 104 may store map data 2314 that may include the calculated POZs 2316, as well as other map data such as an HD map 2318. The map data 2314 may be updated by the data analytics platform executed in the cloud on the service computing devices 108 and/or by roadside units 2202. Furthermore, the vehicle computing device 104 may store localization data 2320 such as object data 2322 and point cloud data 2324.

The vehicle computing devices 104 may receive sensor information from a plurality of sensors 112 such as a camera, radar, lidar, GPS, ultrasonic, and V2X sensor information. In addition, based at least in part on the safety score prediction 2312, the vehicle computing device 104 may control one or more components of the vehicle 102, such as steering, brakes, throttle, transmission, and the like.

In some examples, the POZ may be used to reduce/optimize the number of sensors being used by the vehicle based on the vehicle's location. Moreover, the POZ can help to optimize the number of prediction modules to execute and the amount of sensor data to process, such as for conserving processing power which in turn can improve the vehicle efficiency. For example, in the case where the vehicle is traveling between two intersections, it may not be necessary for the vehicle to execute a pedestrian prediction motion algorithm. Numerous additional advantages and variations will be apparent to those of skill in the art having the benefit of the disclosure herein.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system comprising:
   one or more processors; and
   one or more non-transitory computer-readable media including instructions executable by the one or more processors to configure the one or more processors to perform operations comprising:
   determining a plurality of candidate routes between a source location for a vehicle and a destination location for the vehicle;
   segmenting each candidate route of the plurality of candidate routes into multiple road segments;
   determining a respective observation zone volume for individual road segments of each candidate route of the plurality of candidate routes;
   receiving vehicle sensor configuration information for vehicle sensors onboard the vehicle;
   determining a field of view (FOV) for the vehicle sensors onboard the vehicle;
   comparing an overlap of the FOV for the vehicle sensors with the respective observation zone volumes for the individual road segments of the multiple road segments of each candidate route to determine an amount of overlap of the FOV with each of the respective observation zone volumes for the individual road segments of the multiple road segments of each candidate route;
   determining a safety score for each of the individual road segments of each candidate route based on the amount of overlap determined for each of the individual road segments;
   determining a total safety score for each candidate route based on the safety scores determined for the individual road segments of the candidate route;
   selecting a route for the vehicle from the plurality of candidate routes based at least on the total safety score for the selected route; and
   causing a controller to operate the vehicle according to the selected route.

2. The system as recited in claim 1, wherein the respective observation zone volumes are determined based at least in part on proximity to an intersection functional area.

3. The system as recited in claim 1, wherein the respective observation zone volumes are determined based at least partially on determining a stopping sight distance and a road design speed.

4. The system as recited in claim 1, the operation of comparing the overlap of the FOV for the vehicle sensors with the respective observation zone volumes for the multiple road segments further comprises determining the safety score based on a percentage of overlap of the FOV of the vehicle sensors with the respective observation zone volume for each individual road segment.

5. The system as recited in claim 1, the operations further comprising:
   receiving vehicle information indicating at least a powertrain configuration of the vehicle;
   determining a predicted fuel consumption for the vehicle for the plurality of candidate routes based at least in part on the received powertrain configuration; and selecting the route based partially on considering the predicted fuel consumption.

6. The system as recited in claim 1, the operations further comprising:
  determining a speed profile for individual road segments of the multiple road segments, the speed profile indicating a predicted speed of the vehicle for traversing the individual road segments;
  determining a predicted time for each candidate route and/or a predicted fuel consumption based at least partially on the predicted speed; and
  selecting the route based partially on considering at least one of the predicted time or predicted fuel consumption.

7. A method comprising:
  determining, by one or more processors, a plurality of candidate routes between a source location of a vehicle and a destination location for the vehicle;
  segmenting each candidate route of the plurality of candidate routes into multiple road segments;
  determining a respective observation zone volume for individual road segments of each candidate route of the plurality of candidate routes;
  determining a field of view (FOV) for vehicle sensors onboard the vehicle;
  comparing an overlap of the FOV with the respective observation zone volumes for the individual road segments of the multiple road segments of each candidate route to determine an amount of overlap of the FOV with each of the respective observation zone volumes for the individual road segments of the multiple road segments of each candidate route;
  determining a safety score for each of the individual road segments of each candidate route based on the amount of overlap determined for each of the individual road segments;
  determining a total safety score for each candidate route based on the safety scores determined for the individual road segments of the candidate route;
  selecting a route for the vehicle from the plurality of candidate routes based at least on the total safety score for the selected route; and
  causing a controller to operate the vehicle according to the selected route.

8. The method as recited in claim 7, wherein the respective observation zone volumes are determined based at least in part on proximity to an intersection functional area.

9. The method as recited in claim 7, wherein the respective observation zone volumes are determined based at least partially on determining a stopping sight distance and a road design speed.

10. The method as recited in claim 7, further comprising:
  determining the respective observation zone volumes for the individual road segments of each candidate route based at least on a road width and a turning sight distance.

11. The method as recited in claim 7, wherein comparing the overlap of the FOV with the respective observation zone volumes for the multiple road segments of the candidate routes further comprises determining the safety score based on a percentage of overlap of the FOV of the vehicle sensors with the respective observation zone volume for each individual road segment.

12. The method as recited in claim 7, further comprising:
  receiving vehicle information indicating at least a powertrain configuration of the vehicle;
  determining a predicted fuel consumption for the vehicle for the plurality of candidate routes based at least in part on the received powertrain configuration; and
  selecting the route based partially on considering the predicted fuel consumption.

13. The method as recited in claim 7, further comprising:
  receiving one or more current conditions over a network from one or more computing devices, the one or more current conditions including at least one of: weather conditions, or traffic conditions; and
  selecting a different route for the vehicle based on receiving the one or more current conditions.

14. One or more non-transitory computer-readable media storing instructions executable by one or more processors to configure the one or more processors to perform operations comprising:
  determining a plurality of candidate routes between a source location of a vehicle and a destination location for the vehicle;
  segmenting each candidate route of the plurality of candidate routes into multiple road segments;
  determining a respective observation zone volume for individual road segments of each candidate route of the plurality of candidate routes;
  determining a field of view (FOV) for vehicle sensors onboard the vehicle;
  comparing an overlap of the FOV with the respective observation zone volumes for the individual road segments of the multiple road segments of each candidate route to determine an amount of overlap of the FOV with each of the respective observation zone volumes for the individual road segments of the multiple road segments of each candidate route;
  determining a safety score for each of the individual road segments of each candidate route based on the amount of overlap determined for each of the individual road segments;
  determining a total safety score for each candidate route based on the safety scores determined for the individual road segments of the candidate route;
  selecting a route for the vehicle from the plurality of candidate routes based at least on the total safety score for the selected route; and
  causing a controller to operate the vehicle according to the selected route.

15. The one or more non-transitory computer-readable media as recited in claim 14, the respective observation zone volumes are determined based at least in part on proximity to an intersection functional area.

16. The one or more non-transitory computer-readable media as recited in claim 14, wherein the respective observation zone volumes are determined based at least partially on determining a stopping sight distance and a road design speed.

17. The one or more non-transitory computer-readable media as recited in claim 14, the operations further comprising:
  determining the respective observation zone volumes for the individual road segments of each candidate route based at least on a road width and a turning sight distance.

18. The one or more non-transitory computer-readable media as recited in claim 14, the operation of comparing the overlap of the FOV with the respective observation zone volumes for the candidate routes further comprises determining the safety score based on a percentage of overlap of the FOV of the vehicle sensors with the respective observation zone volume for each individual road segment.

19. The one or more non-transitory computer-readable media as recited in claim 14, the operations further comprising:
   receiving vehicle information indicating at least a powertrain configuration of the vehicle;
   determining a predicted fuel consumption for the vehicle for the plurality of candidate routes based at least in part on the received powertrain configuration; and
   selecting the route based partially on considering the predicted fuel consumption.

20. The one or more non-transitory computer-readable media as recited in claim 14, the operations further comprising:
   determining a speed profile for individual road segments of the multiple road segments, the speed profile indicating a predicted speed of the vehicle for traversing the individual road segments;
   determining a predicted time for each candidate route and/or a predicted fuel consumption based at least partially on the predicted speed; and
   selecting the route based partially on considering at least one of the predicted time or predicted fuel consumption.

* * * * *